US011368028B2

(12) United States Patent
Singh et al.

(10) Patent No.: US 11,368,028 B2
(45) Date of Patent: Jun. 21, 2022

(54) FACILITATING CHARGING OF ACCEPTOR NODES BY MOBILE CHARGING SYSTEMS

(71) Applicant: EVQ TECHNOLOGIES PRIVATE LIMITED, Gurugram (IN)

(72) Inventors: Arjun Singh, Gurugram (IN); Mario Landau Holdsworth, San Francisco, CA (US); Martin Griffith, Bedford (CA)

(73) Assignee: EVQ TECHNOLOGIES PRIVATE LIMITED, Gurugram (IN)

( * ) Notice: Subject to any disclaimer, the term of this patent is extended or adjusted under 35 U.S.C. 154(b) by 94 days.

(21) Appl. No.: 17/022,703

(22) Filed: Sep. 16, 2020

(65) Prior Publication Data
US 2022/0085626 A1 Mar. 17, 2022

(51) Int. Cl.
*H02J 7/00* (2006.01)
*H02J 7/14* (2006.01)
*B60L 53/67* (2019.01)
*B60L 53/66* (2019.01)
*B60L 53/62* (2019.01)

(52) U.S. Cl.
CPC .......... *H02J 7/00032* (2020.01); *B60L 53/62* (2019.02); *B60L 53/665* (2019.02); *B60L 53/67* (2019.02); *H02J 7/0048* (2020.01)

(58) Field of Classification Search
USPC ............................................... 320/107, 104
See application file for complete search history.

(56) References Cited

U.S. PATENT DOCUMENTS

| 9,566,868 | B2 * | 2/2017 | Jammer | G07F 15/003 |
|---|---|---|---|---|
| 2020/0175551 | A1 * | 6/2020 | Penilla | B60L 53/80 |
| 2020/0262305 | A1 * | 8/2020 | Chakraborty | G06Q 20/40155 |
| 2020/0294078 | A1 * | 9/2020 | Hu | B60L 53/62 |
| 2021/0158459 | A1 * | 5/2021 | Verma | G07F 15/005 |
| 2021/0291687 | A1 * | 9/2021 | Ferguson | B60L 58/12 |
| 2021/0382501 | A1 * | 12/2021 | Cheung | G06Q 10/06316 |
| 2021/0394639 | A1 * | 12/2021 | Lu | G06Q 30/0208 |
| 2022/0024346 | A1 * | 1/2022 | Quattrini, Jr. | H02J 7/0027 |

FOREIGN PATENT DOCUMENTS

| CN | 102722767 B | 6/2015 |
| CN | 103915869 B | 4/2016 |
| CN | 110040017 A | 7/2019 |
| GB | 2542848 A | 4/2017 |
| WO | 2019210744 A1 | 11/2019 |

\* cited by examiner

*Primary Examiner* — Alexis B Pacheco
(74) *Attorney, Agent, or Firm* — Chip Law Group

(57) ABSTRACT

A method for facilitating charging is provided. The method includes receiving a charging request from a user device for charging an energy storage device associated with an acceptor node. The method includes determining a set of charging parameters for the energy storage device based on the charging request. The method includes identifying one or more mobile charging systems that are available within a first geographical region associated with the acceptor node and satisfy the set of charging parameters. The method includes allocating, from the one or more mobile charging systems, a first mobile charging system to charge the energy storage device of the acceptor node. Based on the allocation, the first mobile charging system travels from a first location to reach a second location of the acceptor node to charge the energy storage device.

21 Claims, 18 Drawing Sheets

FACILITATING CHARGING OF ACCEPTOR NODES BY MOBILE CHARGING SYSTEMS

FIELD

Various embodiments of the disclosure relate generally to electric vehicles. More specifically, various embodiments of the disclosure relate to methods and systems for facilitating charging of an acceptor node by a mobile charging system.

BACKGROUND

Travelling has always been an indispensable aspect of a person's lifestyle. The person may travel for various reasons such as work, education, vacation, and the like. Generally, the person may use various modes of transportation, such as a motorbike or a car, which runs on fuel, for example, petrol, diesel, or the like. However, such fossil fuel-based vehicles may cause air pollution, sound pollution, and other social and environmental problems, which is undesirable and may lead to global warming and health hazards. Also, fossil fuel resources used in the aforementioned vehicles are depleting, and needs to be used responsibly for maintaining a sustainable environment. Presently, the fossil fuel-based vehicles are being replaced by electric vehicles (EVs) that use electric motors or traction motors for propulsion. An EV may include various batteries (i.e., energy storage devises) that store and provide electric charge required to power the EV. The electric charge stored in such batteries depletes as per the usage of the EV. For example, the electric charge may deplete based on consumption of the electric charge by various electric components of the EV or conversion of the electric charge to the mechanical energy for running the EV. Thus, the discharged batteries need to be charged before the batteries can be further used to power the EV.

Generally, an owner or a driver of the EV may charge the batteries privately at home, a workplace, or a marketplace (such as densely occupied multi-story condominiums and shopping complexes) using a battery charger or at a public stationary location (for example, a charging station, a charging terminal, or the like) that is equipped with the battery charger. However, the owner or driver may not always find it convenient to charge the EV at home or reach the stationary location. In one example, charging the EV at home may require significant infrastructure changes, and upgrades in electrical capacity and architecture of an electric system of the home, which is very expensive. In another example, the owner or the driver may not have a provision to charge the EV at the home, the workplace, or the marketplace. In such a scenario, the owner is left with only one choice that is to visit the stationary location for charging the EV periodically, which is inconvenient. In another example, the driver may be travelling in the EV from a source location to a destination location, and the EV may not have sufficient charge to reach the destination location. In addition, there may not be a stationary location for charging available along the route that is reachable by the EV. Consequently, the EV may not be able to reach the destination location and may get stranded, causing inconvenience to the driver. In another example, the EV, when parked in a parking area for a substantially longer time duration may get completely drained, making it impossible to reach the stationary location for charging. Such stranded EVs may need on-road support to reach the stationary location or the destination location, which may cause financial loss, time delays, and emotional despair to the owner or the driver of the EV, which is undesirable. Moreover, the stationary location may have some grid capacity limitation and therefore may not be able to fast charge the EV. Thus, charging of the EV at the stationary location may be time intensive. Such charging constraints often serve as a bottleneck in the adoption of EVs.

In light of the foregoing, there exists a need for a technical and reliable solution that overcomes the abovementioned problems, and facilitates charging of EVs based on the owner/driver's preferences and habits.

SUMMARY

Methods for facilitating charging of an acceptor node by a mobile charging system are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
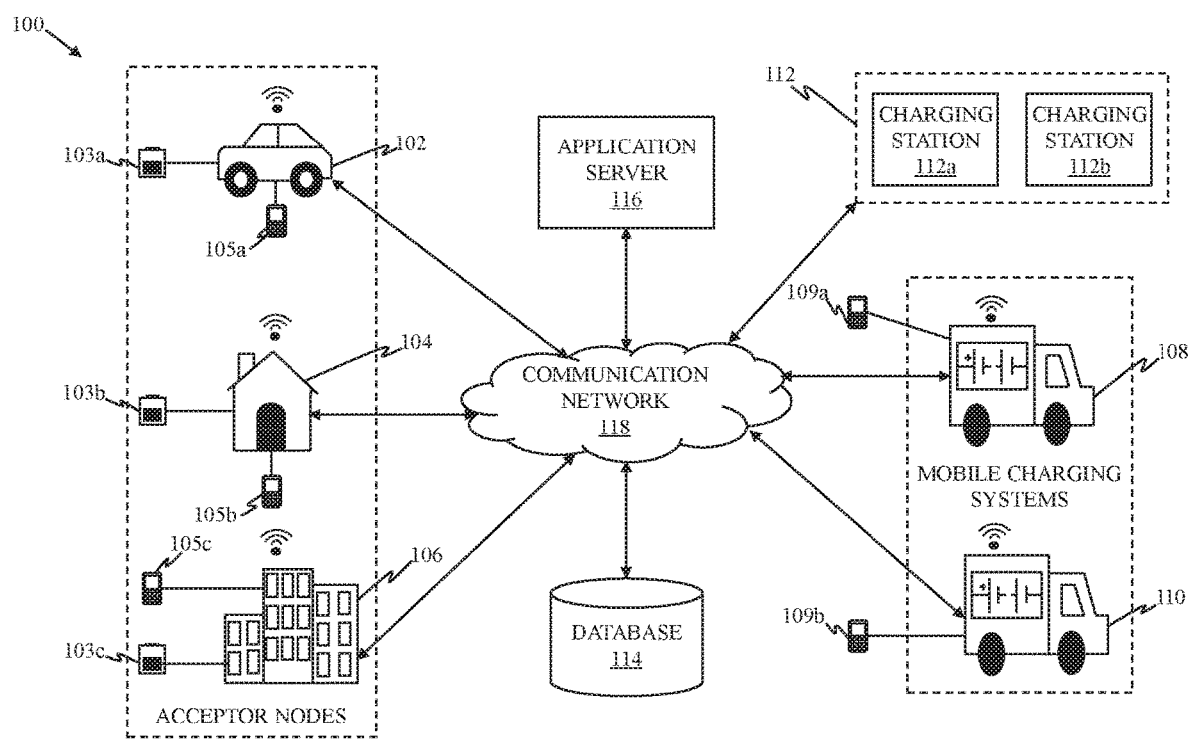
FIG. 1 is a block diagram that illustrates a system environment for facilitating charging of an acceptor node by a mobile charging system, in accordance with an exemplary embodiment of the present disclosure.

Certain embodiments of the disclosure may be found in disclosed systems and methods for facilitating charging of an acceptor node by a first mobile charging system. Exemplary aspects of the disclosure provide methods for facilitating charging of the acceptor node by the first mobile charging system. The methods include various operations that are executed by a server (for example, an application server) to facilitate charging of the acceptor node by the first mobile charging system. The acceptor node may be an electric vehicle (EV) having a chargeable energy storage device (such as a battery), or a building or a complex having the energy storage device to power one or more electric components of the building or the complex. In an embodiment, the server may be configured to receive a charging request from a user device for charging the energy storage device associated with the acceptor node. The charging request may be indicative of a current energy level of the acceptor node. In another embodiment, the server may be configured to receive, from the user device, energy level data of the acceptor node. The energy level data may indicate the current energy level of the energy storage device of the acceptor node. The server may be configured to automatically initiate the charging request for charging the energy storage device based on a detection that the current energy level is less than a first threshold value. The first threshold value may be based on at least one of health optimization criteria of the energy storage device, a user preference of a user associated with the acceptor node, and the behavioral data associated with the historical charging of the energy storage device. In an embodiment, the charging request may be further indicative of a desired energy level of the acceptor node, a charging capacity of the energy storage device, a desired charging rate of the energy storage device, a maximum charging rate of the energy storage device, and a turn-around time for achieving the desired energy level. The server may be further configured to determine a set of charging parameters for the energy storage device based on the charging request. The set of charging parameters may include an amount of charge required to charge the energy storage device to the desired energy level. The set of charging parameters may further include the turn-around time for achieving the desired energy level, the desired charging rate of the energy storage device, and the maximum charging rate of the energy storage device.

The server may be configured to identify one or more mobile charging systems that are available within a first geographical region associated with the acceptor node and satisfy the set of charging parameters for the energy storage device. The one or more mobile charging systems that are available within the first geographical region are identified based on state of charge data and location data of the one or more mobile charging systems. In an embodiment, the server may be configured to rank the one or more mobile charging systems in an order based on health optimization criteria of a charging device of each of the one or more mobile charging systems, a charge transfer rate of the charging device of each of the one or more mobile charging systems, and a turn-around time associated with each of the one or more mobile charging systems to charge the energy storage device. In an embodiment, the server may be configured to render, a user interface, via the user device, to present the ranked one or more mobile charging systems to the user for selection. Further, the server may be configured to allocate from the one or more mobile charging systems, the first mobile charging system to charge the energy storage device of the acceptor node. The server may allocate the first mobile charging system based on at least the ranking of the one or more mobile charging systems or a user preference of the user. The user preference may include a selection of the first mobile charging system from the ranked one or more mobile charging systems presented to the user via the user device. The server may be further configured to communicate an allocation notification to the first mobile charging system based on the allocation. The first mobile charging system, based on the allocation, may travel from a first location to reach a second location of the acceptor node to charge the energy storage device of acceptor node. The first mobile charging system reaches the second location from the first location based on the allocation notification.

The server may be further configured to communicate a confirmation response to the user device to indicate the allocation of the first mobile charging system to charge the energy storage device. The confirmation response may be indicative of real-time location tracking information associated with the first mobile charging system. In an embodiment, the server may be further configured to display, via the user interface on the user device while the energy storage device is being charged by the first mobile charging system, a real-time energy level of the acceptor node, a unit of charge received by the energy storage device from the first mobile charging system, an estimated cost of charging the energy storage device, and a remaining time to charge the energy storage device to the desired energy level.

In an embodiment, the server may be further configured to receive, from each of the one or more mobile charging systems, the state of charge data and the location data in real-time or near real-time. The state of charge data is indicative of a state of charge of a charging device of each of the one or more mobile charging systems. The server may be further configured to store, in a database, the state of charge data and the location data. The server may be further configured to identify an optimal charging station from a plurality of charging stations for each of the one or more mobile charging systems based on at least a drop in the corresponding state of charge of each of the one or more mobile charging systems up to or below a second threshold value, an availability of each of the plurality of charging stations, a turn-around charging time associated with each of the plurality of charging stations, a cost associated with charging the one or more mobile charging systems at each of the plurality of charging stations, a charging rate for charging the one or more mobile charging systems at each of the plurality of charging stations, a configuration of the one or more mobile charging systems, and a time of day for charging the one or more charging systems at each of the plurality of charging stations. The server may be further configured to communicate an instruction to each of the one or more mobile charging systems to reach the corresponding optimal charging station such that each of the one or more mobile charging systems are charged at the corresponding optimal charging station.

Thus, the methods and systems of the disclosure provide a solution for facilitating charging of the acceptor node by the first mobile charging system. The disclosed methods and systems allow a user associated with the acceptor node to charge the energy storage device conveniently. The disclosed method significantly reduces or eliminates a requirement of moving or transporting the acceptor node for charging. Further, the methods disclosed herein allow management of a health status of the energy storage device by charging the energy storage device in accordance with health optimization criteria of the energy storage device. Therefore, the disclosed methods ensure round the clock availability of charge in the energy storage device of the acceptor node and significantly reduce a likelihood of the acceptor node getting stranded or losing critical uptime due to discharged energy storage device. The disclosed systems and methods, allows the user to avail a seamless and timely charging of the energy storage device.

FIG. 1 is a block diagram that illustrates a system environment 100 for facilitating charging of an acceptor node by a mobile charging system, in accordance with an exemplary embodiment of the present disclosure. The system environment 100 includes a plurality of acceptor nodes 102-106 associated with a corresponding plurality of energy storage devices 103a-103c and corresponding plurality of user devices 105a-105c and a plurality of mobile charging systems 108 and 110 associated with a corresponding plurality of driver devices 109a and 109b. The system environment 100 further includes a plurality of charging stations 112a and 112b, a database 114, an application server 116, and a communication network 118. Examples of the communication network 118 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Examples of the communication network 118 may further include a NarrowBand-Internet of Things (NB-IoT) network, a 5G network, a 4G network, a long range (LoRa) wireless technology network, a ZigBee network, an IPv6 Low-power wireless Personal Area Network (6LowPAN), or the like. Various entities (such as the plurality of user devices 105a-105c, the plurality of driver devices 109a and 109b, the plurality of acceptor nodes 102-106, the plurality of mobile charging systems 108 and 110, the database 114, and the application server 116) in the system environment 100 may be coupled to the communication network 118 in accordance with various wired and wireless communication protocols, such as Transmission Control Protocol and Internet Protocol (TCP/IP), User Datagram Protocol (UDP), Long Term Evolution (LTE) communication protocols, or any combination thereof.

The plurality of acceptor nodes 102-106 are entities that are associated with the corresponding plurality of energy storage devices 103a-103c. Examples of the plurality of energy storage devices 103a-103c may include, but are not limited to, batteries, fuel cells, supercapacitors, and ultra-supercapacitors. The plurality of acceptor nodes 102-106 may include suitable logic, circuitry, and interfaces that may be configured to control and perform one or more operations based on electric charge derived from the plurality of energy storage devices 103a-103c, respectively. In an embodiment, each acceptor node 102-106 may be a commercial or residential building, a vehicle (such as an electric vehicle), or any open/closed area having one or more electric components powered by an energy storage device. For the sake of brevity, the acceptor node 102 is shown to be an electric vehicle 102, the acceptor node 104 is shown to be a residential building 104, and the acceptor node 106 is shown to be a commercial building 106 (such as a hospital, an office, or the like). The plurality of acceptor nodes 102-106 or one or more electric components associated with the plurality of acceptor nodes 102-106 are powered by the corresponding plurality of energy storage devices 103a-103c. The plurality of energy storage devices 103a-103c may have different configuration, charge storage capacity, maximum charging rate, health optimization criteria, or the like. The plurality of energy storage devices 103a-103c may get drained upon usage, and thus require periodic charging for its functioning. Further, the plurality of acceptor nodes 102-106 may be associated with the corresponding plurality of user devices 105a-105c. In one example, the plurality of acceptor nodes 102-106 may be capable of communicating with the corresponding plurality of user devices 105a-105c via wired connection (such as an auxiliary cable, ethernet, hardware controlled area network (CAN) bus, or the like) or a wireless connection (such as Bluetooth, Zigbee, Wi-fi hotspot, or the like). Examples of the plurality of user devices 105a-105c may include cell-phones, mobile phones, smartphones, laptops, tablets, phablets, or the like. In another example, the plurality of user devices 105a-105c may be associated with a building management system or a vehicle management system.

For the sake of brevity, the plurality of acceptor nodes 102-106 in FIG. 1 are shown to be buildings and vehicles. However, in other embodiments, the plurality of acceptor nodes 102-106 may be any other mode of transport (such as, a motorboat, an airplane, and the like) or an unmanned aerial vehicle such as a drone.

In an embodiment, the plurality of acceptor nodes 102-106 may not be associated with the corresponding plurality of energy storage devices 103a-103c. In such embodiment, one or more electronic components of the plurality of acceptor nodes 102-106 may be powered by an AC source of power. Further, the plurality of acceptor nodes 102-106, in case of a failure in the AC power source, may initiate the charging request based on power requirement thereof for powering up the one or more electronic components of the plurality of acceptor nodes 102-106.

Each user device 105a-105c may be configured to track real-time or near real-time location of the corresponding plurality of acceptor nodes 102-106. Each user device 105a-105c may be further configured to communicate the real-time or near real-time location of the corresponding plurality of acceptor nodes 102-106 to the application server 116. Each user device 105a-105c may be further configured to track a current energy level of the corresponding plurality of acceptor nodes 102-106. The current energy level refers to an amount of electric charge available in the corresponding plurality of acceptor nodes 102-106. Each user device 105a-105c may be further configured to communicate the energy level data indicative of the current energy level of the corresponding plurality of acceptor nodes 102-106 to the application server 116. Each user device 105a-105c may be configured to execute a service application hosted by the application server 116 such that the service application may serve as a gateway to the application server 116. The plurality of user devices 105a-105c may be configured to present a user interface of the executed service application, which enables the corresponding plurality of users to initiate charging requests for charging the corresponding plurality of acceptor nodes 102-106. It will be apparent to a person of ordinary skill in the art that charging of an acceptor node is same as charging an energy storage device of the acceptor node.

The plurality of mobile charging systems 108 and 110 are movable entities (e.g., a vehicle, a cart, a movable charging terminal, or the like) that are equipped with charging devices, such as a battery, a supercapacitor, a fuel cell, an ultra-supercapacitor, a generator, an inverter, an uninterruptible power supply (UPS), or the like. The plurality of mobile charging systems 108 and 110 may include suitable logic, circuitry, and interfaces that may be configured to perform one or more operations for charging the plurality of energy storage devices 103a-103c. In an embodiment, the plurality of mobile charging systems 108 and 110 may include one or more autonomous carriers (such as drones) that hold the charging devices of the plurality of mobile charging systems 108 and 110. Such autonomous carriers may enable to provide charging support in areas where the plurality of mobile charging systems 108 and 110 unable to reach by ground transport. The plurality of mobile charging systems 108 and 110 are interchangeably referred to as "a plurality of donor nodes 108 and 110".

In an embodiment, each mobile charging system 108 and 110 may include the charging device configured to store electric charge required for charging the plurality of energy storage devices 103a-103c. The stored electric charge may get drained upon usage, and hence each mobile charging system 108 and 110 may be recharged at any of the plurality of charging stations 112a and 112b. In another embodiment, each mobile charging system 108 and 110 may include one or more electric components (such as an electric power generator) configured to generate electric charge required for charging the plurality of energy storage devices 103a-103c. In such a scenario, the plurality of mobile charging systems 108 and 110 do not require recharging at the plurality of charging stations 112a and 112b. In an embodiment, the charging devices of the plurality of mobile charging systems 108 and 110 may be detachable and replaceable.

In an embodiment, the plurality of mobile charging systems 108 and 110 may be driven by a corresponding plurality of drivers. The plurality of drivers may have a corresponding plurality of driver devices 109a and 109b, which enables the plurality of drivers to accept or reject various charging requests of the plurality of acceptor nodes 102-106. In another embodiment, the plurality of mobile charging systems 108 and 110 may be semi-automated and may require little or no intervention from the corresponding drivers. In another embodiment, the plurality of mobile charging systems 108 and 110 may be autonomous vehicles and do not require any driver for providing driving assistance.

In an embodiment, each of the plurality of mobile charging systems 108 and 110 may be capable of charging only one energy storage device at a time. In another embodiment, each mobile charging system 108 and 110 may be capable of charging multiple energy storage devices simultaneously.

In an embodiment, each mobile charging system 108 and 110 may include a rolling platform, a push cart, a hand cart, a forklift, a truck or trailer, a charge storage equipment (i.e., the charging device), an energy storage device charger, one or more connectors for receiving power, one or more connectors (i.e., hardware for charge transfer) for charging the plurality of acceptor nodes 102-106, or one or more bidirectional connectors for receiving power as well as for charging the plurality of acceptor nodes 102-106. In one embodiment, the plurality of mobile charging systems 108 and 110 may include a telematics device or an on-board diagnostics (OBD) device that may be configured to communicate with the application server 116 or the corresponding plurality of driver devices 109a and 109b.

In one embodiment, each mobile charging system 108 and 110 may be charged by way of another mobile charging system instead of visiting the plurality of charging stations 112a and 112b. For example, the mobile charging system 108 may accept a charging request to charge the acceptor node 102 and subsequent to the charging of the acceptor node 102, the mobile charging system 108 may initiate a charging request for charging the corresponding charging device by another mobile charging system.

In an embodiment, the plurality of mobile charging systems 108 and 110 may be associated with a fleet manager. The fleet manager may be a service provider that has deployed the plurality of mobile charging systems 108 and 110 to provide an on-demand charging service to the plurality of acceptor nodes 102-106. The charging service may be requested by the users associated with the plurality of acceptor nodes 102-106 by initiating charging requests via the service application or initiated automatically by the application server 116 based on the energy level data of the plurality of acceptor nodes 102-106. The charging requests may refer to demands for charging the plurality of acceptor nodes 102-106.

In an embodiment, the plurality of mobile charging systems 108 and 110 may be capable of fulfilling power or charge requirements of those acceptor nodes that do not have energy storage devices. For example, the plurality of mobile charging systems 108 and 110 may use the corresponding charging device (e.g., an on-board inverter) to supply power to an AC power source that may be connected to an electrical panel of an acceptor node that does not include an on-site energy storage device.

The plurality of driver devices 109a and 109b may be cell-phones, mobile phones, smartphones, laptops, tablets, phablets, vehicle head unit, or the like. Each driver device 109a and 109b may be equipped with a Global Positioning System (GPS) sensor that tracks or monitors a real-time or near real-time location of the corresponding plurality of mobile charging systems 108 and 110. Each driver device 109a and 109b may be further configured to communicate location data of the corresponding plurality of mobile charging systems 108 and 110 to the application server 116. Each driver device 109a and 109b may be further configured to track or monitor a current state of charge of the corresponding plurality of mobile charging systems 108 and 110 and communicate state of charge data of the corresponding plurality of mobile charging systems 108 and 110 to the application server 116. The state of charge data refers to an amount of charge that is available with the corresponding plurality of mobile charging systems 108 and 110. For example, each driver device 109a and 109b may be capable of coupling (wirelessly and/or wired connection) with the telematics device or the OBD device of the corresponding mobile charging system 108 and 110 for receiving the state of charge data and location data. In another embodiment, the telematics device or the OBD device of the plurality of mobile charging systems 108 and 110 may communicate the state of charge data, the location data, or the like directly to the application server 116.

Each driver device 109a and 109b may be further configured to execute the service application that is hosted by the application server 116. The plurality of driver devices 109a and 109b may be configured to present a user interface of the executed service application, which enables the corresponding plurality of drivers may accept or reject the charging requests of the plurality of acceptor nodes 102-106.

The plurality of charging stations 112a and 112b may include suitable logic, circuitry, and interfaces that may be configured to perform one or more operations for charging electric components that are configured to store electric charge. Each charging station 112a and 112b is a stationary terminal that is present at a fixed location and has one or more charging ports to which the plurality of mobile charging systems 108 and 110 connect for charging. Each of the plurality of charging stations 112a and 112b may correspond to a location, a node, or an outlet where the plurality of mobile charging systems 108 and 110 may charge the corresponding charging devices. In an embodiment, the plurality of charging stations 112a and 112b may be DC fast charging stations, level 1 charging stations, level 2 charging stations, or may provide an output from a power generation source generating alternating current (AC) or direct current (DC). In an embodiment, the drained charging devices of the plurality of mobile charging systems 108 and 110 may be detached and replaced at the plurality of charging stations 112a and 112b. For example, the plurality of charging stations 112a and 112b may have one or more spare charging devices that are already charged. These spare charging devices may be used to replace the drained charging devices of the plurality of mobile charging systems 108 and 110. In other words, the charging devices of the plurality of mobile charging systems 108 and 110 may be swapped with the one or more charged charging devices available at the plurality of charging stations 112a and 112b. The use of such detachable charging devices reduces the downtime of the plurality of charging stations 112a and 112b.

In one example, the plurality of charging stations 112a and 112b may be associated with the fleet manager. In another embodiment, the plurality of charging stations 112a and 112b may be a third-party service that provides charging facility to the plurality of mobile charging systems 108 and 110.

The database 114 may include suitable logic, circuitry, interfaces, and/or code, executable by the circuitry, that may be configured to perform one or more operations for storing data associated with the plurality of acceptor nodes 102-106, the plurality of mobile charging systems 108 and 110, and the plurality of charging stations 112a and 112b. For example, the database 114 may store user preference data associated with the plurality of acceptor nodes 102-106, data associated with health optimization criteria of the plurality of energy storage devices 103a-103c, state of charge data associated with each mobile charging system 108 and 110, health optimization criteria of each mobile charging system 108 and 110, an availability status of each of the plurality of charging stations 112a and 112b, or the like. Examples of the database 114 may include a cloud-based database, a local database, a distributed database, a database management system (DBMS), or the like.

Although the database 114 is shown as a standalone entity in FIG. 1, in other embodiments, the database 114 may be integrated with the application server 116 without deviating from the scope of the disclosure.

The application server 116 may include suitable logic, circuitry, interfaces, and/or code, executable by the circuitry, that may be configured to perform one or more operations for facilitating charging of the plurality of acceptor nodes 102-106 by the plurality of mobile charging systems 108 and 110. The application server 116 may be configured to communicate with the database 114, the plurality of acceptor nodes 102-106, the plurality of user devices 105a-105c, the plurality of mobile charging systems 108 and 110, the plurality of driver devices 109a and 109b, and the plurality of charging stations 112a and 112b via the communication network 118. Examples of the application server 116 includes a cloud-based server, a local server, a group of centralized servers, a group of distributed servers, or the like. Various components of the application server 116 are described in detail in conjunction with FIG. 2.

The application server 116 may be configured to receive state of charge and location data from each mobile charging system 108 and 110 in real-time or near real-time or periodically (for example, after 30 seconds, 60 seconds, 90 seconds, or the like). The state of charge data is indicative of a state of charge of the charging device of each of the plurality of mobile charging systems 108 and 110. The application server 116 may be configured to store the received state of charge data and the location data in the database 114. The application server 116 may be further configured to receive energy level data of each of the plurality of acceptor nodes 102-106 from the corresponding plurality of user devices 105a-105c in real-time, near real-time, or periodically. The energy level data may indicate a current energy level of each of the plurality of energy storage devices 103a-103c. The application server 116 may be configured to receive charging requests from user devices (for example, the plurality of user devices 105a-105c) for charging corresponding acceptor nodes (such as the plurality of acceptor nodes 102-106 or any other acceptor node). For the sake of brevity, the other operations performed by the application server 116 are described with respect to the acceptor node 102.

In an embodiment, the application server 116 may be configured to receive a charging request from the user device 105a for charging the energy storage device 103a associated with the acceptor node 102. The charging request may be indicative of the current energy level (i.e. remaining electric charge in the energy storage device 103a) of the acceptor node 102. In another embodiment, the application server 116 may be configured to automatically initiate the charging request for the acceptor node 102 based on a detection that the current energy level, as indicated by the energy level data of the energy storage device 103a, is less than a first threshold value. In another embodiment, the application server 116 may be configured to automatically initiate the charging request for the acceptor node 102 based on a detection that the current energy level, as indicated by the energy level data of the energy storage device 103a, is equal to the first threshold value.

The application server 116 may be further configured to determine a set of charging parameters for the energy storage device 103a based on the charging request. The set of charging parameters may include one or more constraints for charging the energy storage device 103a and the application server 116 may determine the set of charging parameters based on the information included in the charging request.

The set of charging parameters may include an amount of charge required for charging the energy storage device 103a to a desired energy level. The set of charging parameters may further include a turn-around time to charge the energy storage device 103a to the desired energy level, a desired charging rate of the energy storage device 103a, and a maximum charging rate of the energy storage device 103a. The maximum charging rate of the energy storage device 103a may be a maximum rate of charging the energy storage device 103a based on the configuration of the energy storage device 103a. In an example, the maximum rate of charging the energy storage device 103a may be 5 kilowatt (kW). Therefore, the energy storage device 103a should always be charged with a charging rate less than 5 kW to maintain good health of the energy storage device 103a. Beneficially, the set of parameters of the energy storage device 103a indicates conditions and configuration for charging the energy storage device 103a that are favorable to the corresponding user and also maintains a good health of the energy storage device 103a.

The application server 116 may be further configured to identify one or more of the plurality of mobile charging systems 108 and 110 that are available within a first geographical region associated with the acceptor node 102 and satisfy the set of charging parameters determined for the energy storage device 103a. The first geographical region may be a geographical area surrounding the acceptor node 102, within which at least one mobile charging system that satisfies the set of charging parameters of the energy storage device 103a is available.

In an embodiment, the application server 116 may be configured to rank the identified mobile charging systems 108 and 110 in an order based on at least health optimization criteria of the charging device of each identified mobile charging system 108 and 110, a charge transfer rate of the charging device of each identified mobile charging system 108 and 110, and a turn-around time associated with each identified mobile charging system 108 and 110. The charge transfer rate of a charging device may be a pace or speed at which the charging device is configured to charge the acceptor node 102. The charge transfer rate of the charging device may be dynamically adjusted to comply with the desired charging rate and maximum charging rate of the acceptor node 102.

The application server 116 may be configured to render a user interface on a display of the user device 105a to present the ranked mobile charging systems 108 and 110 to the user of the user device 105a. The application server 116 may be further configured to allocate, from the identified mobile charging systems 108 and 110, a first mobile charging system (e.g., the mobile charging system 108), to charge the energy storage device 103a of the acceptor node 102. Further, based on the allocation, the first mobile charging system travels from a first location (i.e., the current location of the first mobile charging system) to reach a second location of the acceptor node 102 to charge the energy storage device 103a. The first location may be a geographical location of the first mobile charging system, a landmark in vicinity of the first mobile charging system, or the like. The second location may be a geographical location of the acceptor node 102, a landmark in vicinity of the acceptor node 102, a predefined location, a building name, a street name, or the like. In an embodiment, the application server 116 may allocate the first mobile charging system based on the ranking of the identified mobile charging systems 108 and 110. For example, the application server 116 may allocate the highest ranked mobile charging system to the acceptor node 102. In another embodiment, the application server 116 may allocate the first mobile charging system based on the behavioral data associated with historical charging of the energy storage device 103a. The historical charging of the energy storage device 103a may correspond to various charging events executed for the acceptor node 102 in the past. In another embodiment, the application server 116 may allocate the first mobile charging system based on the user preference of the user associated with the user device 105a. The user preference may include a selection of the first mobile charging system by the user from the ranked mobile charging systems 108 and 110 displayed on the user device 105a.

The application server 116 may be further configured to communicate an allocation notification to the selected first mobile charging system. The first mobile charging system may communicate, to the application server 116, an allocation confirmation based on its availability to reach the second location to charge the energy storage device 103a.

In an embodiment, the application server 116 may be further configured to communicate a confirmation notification to the user device 105a to indicate the allocation of the first mobile charging system to charge the energy storage device 103a. The confirmation notification indicates successful allocation of the first mobile charging system to charge the energy storage device 103a. The confirmation notification may include real-time location tracking information associated with the first mobile charging system.

The application server 116 may be further configured to display, via the user interface on the user device 105a while the energy storage device 103a is being charged by the first mobile charging system, a real-time energy level of the acceptor node 102, a unit of charge received by the energy storage device 103a from the first mobile charging system, an estimated cost of charging the energy storage device 103a, and a remaining time to charge the energy storage device 103a to the desired energy level. The desired energy level may be the amount of electric charge required by the energy storage device 103a. The desired energy level may be a cumulative sum of the current energy level and the additional amount of charge required to charge the energy storage device 103a.

It will be apparent to a person of ordinary skill in the art that the application server 116 may perform aforementioned operations for facilitating charging of the energy storage devices 103b and 103c of other acceptor nodes 104 and 106, respectively, without deviating from the scope of the disclosure. Since the application server 116 may receive or initiate multiple charging requests at the same time, the application server 116 may be configured to optimally allocate charging resources to ensure better resource utilization and smoother user experience.

In an embodiment, the application server 116 may be further configured to identify an optimal charging station from the plurality of charging stations 112a and 112b for each mobile charging system 108 and 110 for charging. The application server 116 may identify the optimal charging station for each mobile charging system 108 and 110 based on at least a drop in the corresponding state of charge of each mobile charging system 108 and 110 up to or below a second threshold value, an availability of each of the plurality of charging stations 112a and 112b, a turn-around charging time associated with each of the plurality of charging stations 112a and 112b, and a cost associated with charging the plurality of mobile charging systems 108 and 110 at each of the plurality of charging stations 112a and 112b. The application server 116 may identify the optimal charging station for each mobile charging system 108 and 110 further based on a charging rate for charging the plurality of mobile charging systems 108 and 110 at each of the plurality of charging stations 112a and 112b, a configuration of the plurality of mobile charging systems 108 and 110, and a time of day (ToD) or a time of use (ToU) for charging the plurality of mobile charging systems 108 and 110 at each of the plurality of charging stations 112a and 112b. The cost of charging the plurality of mobile charging systems 108 and 110 at each of the plurality of charging stations 112a and 112*b* may vary based on, but not limited to, the charging rate for charging the plurality of mobile charging systems 108 and 110, an energy charge, a demand charge, the configuration of the plurality of mobile charging systems 108 and 110 (i.e., hardware and software parameters and limitations), the ToD or ToU for charging, a current state of charge of the plurality of mobile charging systems 108 and 110, a charge requirement of the plurality of mobile charging systems 108 and 110, green or carbon credits associated with the plurality of mobile charging systems 108 and 110, a geographical location of the plurality of mobile charging systems 108 and 110, and a demand of charging among the plurality of mobile charging systems 108 and 110 in the geographical location. The application server 116 may be further configured to communicate an instruction (i.e., a command) to each of the plurality of mobile charging systems 108 and 110 to reach the corresponding optimal charging station for charging. Each of the plurality of mobile charging systems 108 and 110 are charged at the corresponding optimal charging station.

Figure 2:
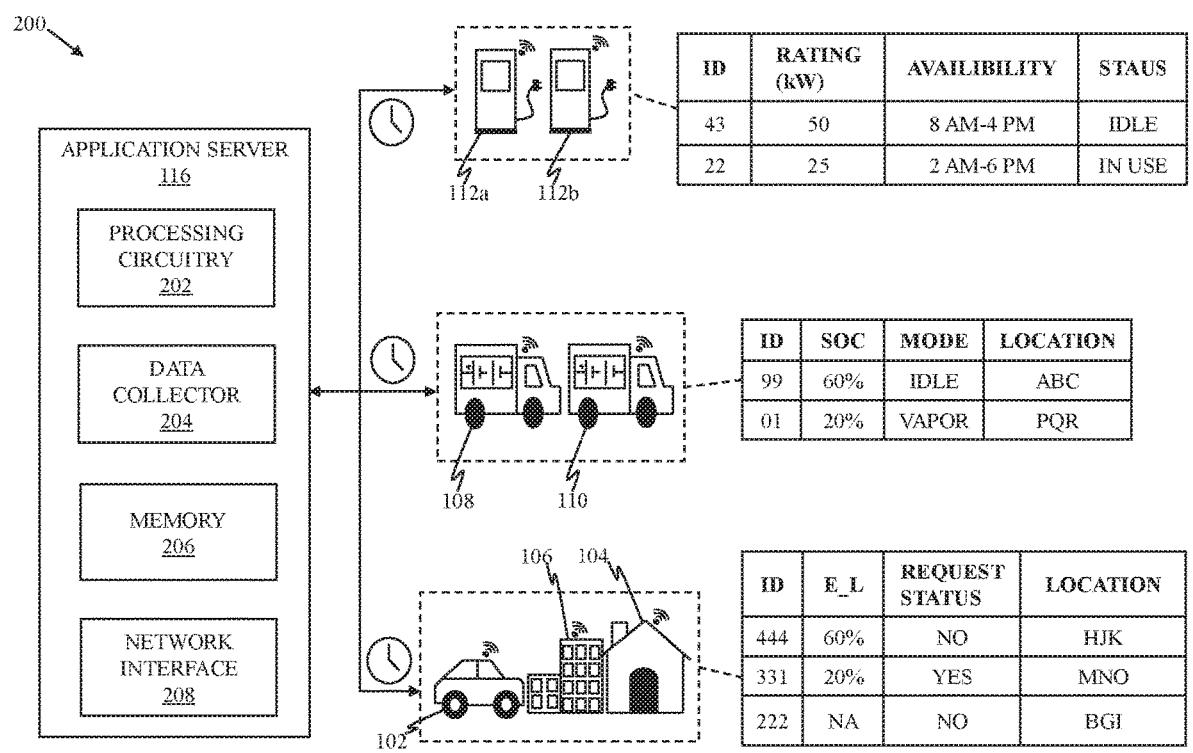
FIG. 2 is a block diagram that illustrates an application server of FIG. 1, in accordance with an exemplary embodiment of the present disclosure.

FIG. 2 is a block diagram 200 that illustrates the application server 116, in accordance with an exemplary embodiment of the disclosure. The application server 116 may include processing circuitry 202, a data collector 204, a memory 206, and a network interface 208.

The processing circuitry 202 may include suitable logic, circuitry, interfaces, and/or code, executable by the circuitry, that may be configured to execute the instructions stored in the memory 206 to perform various operations for facilitating charging of the acceptor nodes 102-106 by the plurality of mobile charging systems 108 and 110. The processing circuitry 202 may be configured to perform various operations associated with data collection and data processing. The processing circuitry 202 may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the processing circuitry 202 may be compatible with multiple operating systems. For the sake of brevity, the operations performed by the processing circuitry are described with respect to the acceptor node 102.

The processing circuitry 202 may be configured to host the service application that is executable on the plurality of user devices 105*a*-105*c* and the plurality of driver devices 109*a* and 109*b*. The service application may be executable in various modes of operation as per functional requirements of users and drivers. For example, the service application may be executable in a user mode on the plurality of user devices 105*a*-105*c* and a driver mode on the plurality of driver devices 109*a* and 109*b*. In an embodiment, the processing circuitry 202 may be configured to receive the charging request from the user device 105*a*, for charging the energy storage device 103*a* of with the acceptor node 102. In another embodiment, the processing circuitry 202 may be further configured to initiate the charging request based on the detection that the current energy level of the acceptor node 102 is less than the first threshold value. The processing circuitry 202 may be further configured to determine the set of charging parameters for the energy storage device 103*a* based on the charging request.

The processing circuitry 202 may be further configured to identify those mobile charging systems 108 and 110 that are available within the first geographical region associated with the acceptor node 102 and satisfy the set of charging parameters for the energy storage device 103*a*. The processing circuitry 202 may be configured to rank the plurality of mobile charging systems 108 and 110 in the order based on the health optimization criteria of the charging device of each of the identified mobile charging systems 108 and 110, the turn-around time associated with each of the identified mobile charging systems 108 and 110. The processing circuitry 202 may be further configured to render the user interface, via the user device 105*a*, to present the ranked mobile charging systems 108 and 110 to the corresponding user for selection. The processing circuitry 202 may be further configured to allocate one of the ranked mobile charging systems 108 and 110 to charge the energy storage device 103*a* of the acceptor node 102. The processing circuitry 202 may be further configured to communicate allocation notification to the allocated mobile charging system (e.g., the mobile charging system 108). The processing circuitry 202 may be further configured to communicate the confirmation notification to the user device 105*a* to indicate the successful allocation of the mobile charging system 108. The processing circuitry 202 may be further configured to display, via the user interface of the user device 105*a* while the energy storage device 103*a* is being charged by the mobile charging system 108, the real-time energy level of the acceptor node 102, the unit of charge received by the energy storage device 103*a* from the mobile charging system 108, the estimated cost of charging, and the remaining time to charge the energy storage device 103*a* to the desired energy level.

The data collector 204 may include suitable logic, circuitry, interfaces, and/or code, executable by the circuitry, that may be configured to collect the data from the plurality of charging stations 112*a* and 112*b*, the plurality of mobile charging systems 108 and 110, and the plurality of acceptor nodes 102-106. The data collector 204 may be further configured to collect data from the plurality of user devices 105*a*-105*c* and the plurality of driver devices 109*a* and 109*b*. In an embodiment, the data collector 204 may collect the data in real-time or near real-time. In another embodiment, the data collector 204 may be configured to collect the data periodically (for example, after 30 seconds, 60 seconds, 90 seconds, 120 seconds, or the like). The data collector 204 may be configured to store the collected data in the memory 206 or the database 114. The data collector 204 may be implemented by one or more processors, such as, but not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the data collector 204 may be compatible with multiple operating systems. In an embodiment, the data may be collected by the data collector 204 by way of the service application executed on the plurality of user devices 105*a*-105*c*, the plurality of driver devices 109*a* and 109*b*, and the plurality of charging stations 112*a* and 112*b*.

The data collected from the plurality of charging stations 112*a* and 112*b* may include a unique identifier of each charging station 112*a* and 112*b*, a charge rating of each charging station 112*a* and 112*b*, an availability of each charging station 112*a* and 112*b*, and a status of each charging station 112*a* and 112*b*. The unique identifier of each charging station 112*a* and 112*b* may correspond to an alphabetical identifier, a numerical identifier, an alpha-numeric identifier, or a symbol that uniquely identifies the corresponding charging station 112a or 112b. The charge rating of each charging station 112a and 112b may be a rate of charging offered by the corresponding charging station 112a or 112b for charging the plurality of mobile charging systems 108 and 110. The availability of each charging station 112a and 112b indicates a time-interval during which the corresponding charging station 112a or 112b is available to charge the plurality of mobile charging systems 108 and 110. The status of each charging station 112a and 112b indicates a current status (for example, in use, idle, out of service, or broken) of the corresponding charging station 112a or 112b. As shown in FIG. 2, the data collected by the data collector 204 from the charging station 112a includes the unique identifier "43", the charge rating "50 kW", the time-interval for availability "8 am-4 pm", and the status as "idle". The data collected by the data collector 204 from the charging station 112b includes the unique identifier "22", the charge rating "25 kW", the time-interval for availability "2 pm-6 pm", and the status as "in use". The data collector 204 may be configured to update the status of each of the plurality of charging stations 112a and 112b in real-time or near real-time based on the collected data.

The data collected from the plurality of mobile charging systems 108 and 110 may include a unique identifier of each of mobile charging system 108 and 110, a state of charge (i.e., state of charge data) of the charging device of each mobile charging system 108 and 110, a mode of each mobile charging system 108 and 110, and a location (i.e., location data) of each mobile charging system 108 and 110. The unique identifier of each mobile charging system 108 and 110 may correspond to an alphabetical identifier, a numerical identifier, an alpha-numeric identifier, or a symbol that uniquely identifies the corresponding mobile charging system 108 or 110. The state of charge of each mobile charging system 108 and 110 may be an amount of electric charge that is stored in the charging device of the corresponding mobile charging system 108 or 110. The mode of each mobile charging system 108 and 110 may be an operational mode of the corresponding mobile charging system 108 or 110. The operational mode may be one of a vapor mode, an idle mode, and a drain mode. The vapor mode refers to the operational mode during which a mobile charging system is being charged at any of the plurality of charging stations 112a and 112b. The idle mode refers to the operational mode during which a mobile charging system is free, i.e. neither getting charged at any charging station 112a or 112b nor charging any of the plurality of acceptor nodes 102-106. The drain mode refers to the operational mode during which a mobile charging system is in use for charging any of the plurality of acceptor nodes 102-106. The location data collected from each mobile charging system 108 and 110 indicates a current location of the corresponding mobile charging system 108 or 110. As shown in FIG. 2, the data collected from the mobile charging system 108 includes the unique identifier "99", the state of charge "60%", "idle" mode, and the current location "ABC". In an embodiment, the location may correspond to latitude and longitude co-ordinates, an address, or a landmark. The data collected from the mobile charging system 110 includes the unique identifier "01", the state of charge "20%", "Vapor" mode, and the current location "PQR".

The data collected from the plurality of acceptor nodes 102-106 may include a unique identifier of each acceptor node 102-106, an energy level of each acceptor node 102-106, a request status of each acceptor node 102-106, and a location of each acceptor node 102-106. The unique identifier of each acceptor node 102-106 corresponds to an alphabetical identifier, a numerical identifier, an alpha-numeric identifier, or a symbol that uniquely identifies the corresponding acceptor node 102-106. In an example, the unique identifier may be a vehicle identification number. The energy level of each acceptor node 102-106 may be an amount of electric charge that is stored in the corresponding energy storage device 103a-103c of the corresponding acceptor node 102-106. The request status of each acceptor node 102-106 indicates if the charging request has been initiated or received for charging the corresponding acceptor node 102-106. The location data collected from each acceptor node 102-106 indicates a current location of the corresponding acceptor node 102-106. As shown in FIG. 2, the data collected by the data collector 204 from the acceptor node 102 includes the unique identifier "444", the energy level "60%,", the request status "NO", and the location "HJK". The data collected by the data collector 204 from the acceptor node 104 includes the unique identifier "331", the energy level "20%,", the request status "YES, and the location "MNO". The data collected by the data collector 204 from the acceptor node 106 includes the unique identifier "222", the energy level "NA" (not available), the request status "NO", and the location "BGI".

The data collector 204 may be further configured to collect behavioral data associated with the charging of the plurality of acceptor nodes 102-106. Behavioral data collection is described in detail in conjunction with FIG. 3.

The memory 206 may include suitable logic, circuitry, and interfaces that may be configured to store one or more instructions which when executed by the processing circuitry 202 and the data collector 204 cause the processing circuitry 202 and the data collector 204 to perform various operations to facilitate charging of the plurality of acceptor nodes 102-106 by the plurality of mobile charging systems 108 and 110. The memory 206 may be configured to store the user preferences, the behavioral data associated with the historical charging of the plurality of energy storage devices 103a-103c, and the health optimization criteria of the plurality of energy storage devices 103a-103c and the charging device of each of the plurality of mobile charging systems 108 and 110. The memory 206 may be accessible by the processing circuitry 202 and the data collector 204. Examples of the memory 206 may include, but are not limited to, a random-access memory (RAM), a read only memory (ROM), a removable storage drive, a hard disk drive (HDD), a flash memory, a solid-state memory, or the like. It will be apparent to a person skilled in the art that the scope of the disclosure is not limited to realizing the memory 206 in the application server 116, as described herein. In another embodiment, the memory 206 may be realized in form of a database or a cloud storage (e.g., the database 114) working in conjunction with the application server 116, without departing from the scope of the disclosure.

The network interface 208 may include suitable logic, circuitry, interfaces, and/or code, executable by the circuitry, that may be configured to enable the application server 116 to communicate with the database 114, the plurality of charging stations 112a and 112b, the plurality of mobile charging systems 108 and 110, and the plurality of acceptor nodes 102-106. The network interface 208 may be implemented as a hardware, software, firmware, or a combination thereof. Examples of the network interface 208 may include a network interface card, a physical port, a network interface device, an antenna, a radio frequency transceiver, a wireless transceiver, an Ethernet port, a universal serial bus (USB) port, or the like.

Figure 3:
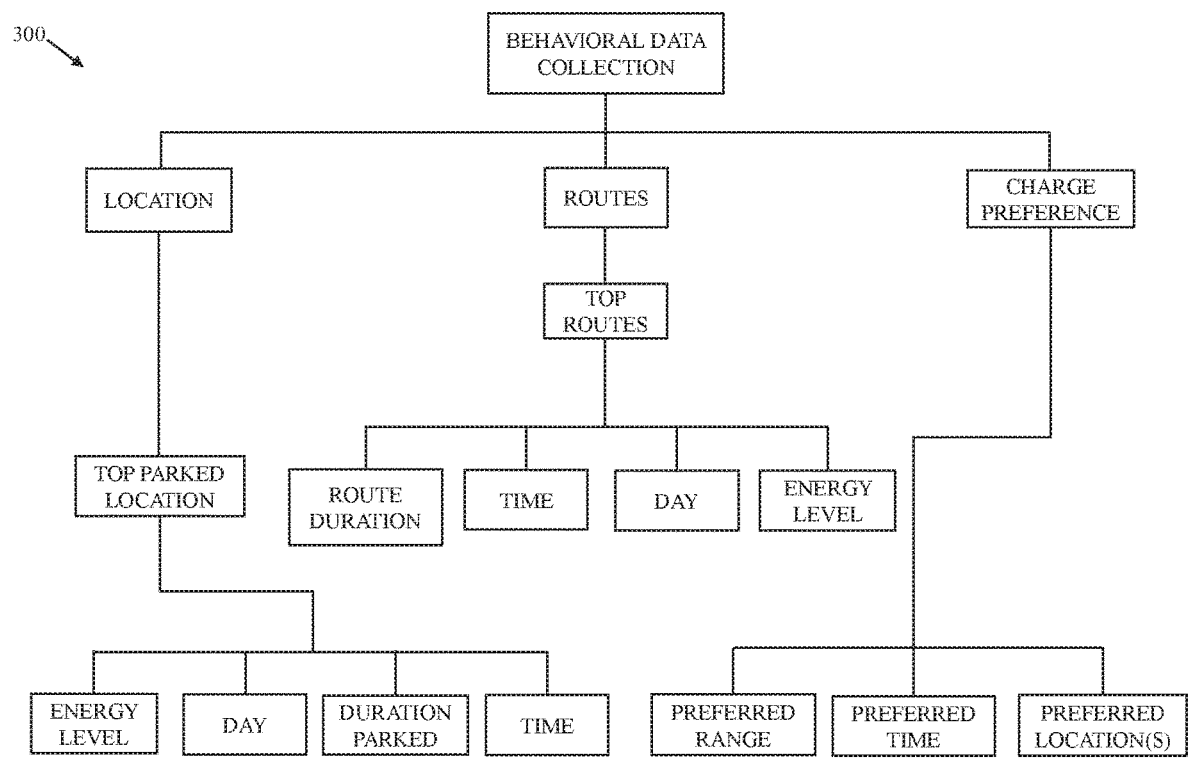
FIG. 3 is a block diagram that illustrates behavioral data collection by the application server of FIG. 1 for an acceptor node of FIG. 1, in accordance with an embodiment of the present disclosure.

FIG. 3 is a block diagram 300 that illustrates behavioral data collection by the application server 116 for the acceptor node 102, in accordance with an embodiment of the present disclosure. The data collector 204 may be configured to collect the behavioral data associated with charging of the acceptor node 102. The data collector 204 may be further configured to store the collected behavioral data in the database 114 and/or the memory 206. The behavioral data may include one or more parameters or attributes associated with the charging of the energy storage device 103a. For example, the behavioral data associated with the acceptor node 102 may include time of charging, location of charging, energy level at which charging was initiated, a desired energy level for the charging, a cost associated with the charging, a turn-around time associated with the charging, a route during which the charging was performed, a route after which the charging was performed, or the like.

The behavioral data collection may further include collection of three categories of data such as location data of the acceptor node 102, travel routes associated with the acceptor node 102, and charge preference associated with the acceptor node 102. The location data includes information associated with various locations travelled by or associated with the acceptor node 102. For example, as shown in FIG. 3, the location data may include top parked locations where the acceptor node 102 has been parked. The location data may further include energy level of the acceptor node 102 when parked at each of the top parked locations, day(s) at which the acceptor node 102 was parked at each of the top parked locations, a duration for which the acceptor node 102 was parked at each of the top parked locations, and a time at which the acceptor node 102 reaches each of the top parked locations. The travel routes indicate a route or path traversed by the acceptor node 102 for travelling from one location to another. The travel route may include top routes traversed by the acceptor node 102. The routes data may further include route duration associated with each of the top routes traversed by the acceptor node 102, a time-interval spent by the acceptor node 102 for traversing the top routes, a day on which each of the top routes has been traversed by the acceptor node 102, and an energy level of the acceptor node 102 while traversing each of the top routes. The charge preference data may indicate a preference of the user of the acceptor node 102 for charging the energy storage device 103a and/or observed historical charging pattern of the acceptor node 102. The charge preference data may include a preferred (or actual) range within which the user maintains the energy level of the acceptor node 102, a preferred (or actual) time at which the user prefers to charge (or charges) the acceptor node 102, and preferred location(s) (or actual locations) at which the user prefers to charge (or charges) the acceptor node 102. The location data, the route data, and the charge preference data collectively form the behavioral data associated with the charging of the energy storage device 103a. Beneficially, initiating a charging request based on the behavioral data allows for a seamless charging of the acceptor node 102. Further, initiating the charging request based on the behavioral data significantly reduces effort and time of the user required for periodic charging of the acceptor node 102.

In an embodiment, the charge preference data may include historical data of charging sessions for the acceptor node 102. The historical data may include a range within which the acceptor node 102 has been charged in the past, a time at the acceptor node 102 has been charged in the past, and location(s) at which the acceptor node 102 has been charged in the past.

In an example scenario, the behavioral data collected for the acceptor node 102 may indicate that the acceptor node 102 is parked at a location "FNU" for 4 hours at every Monday, Wednesday, and Friday. The behavioral data may further indicate that the energy level of the acceptor node 102, when it was parked at the location "FNU", is "X1". The user of the acceptor node 102 may have requested the application server 116 for charging the acceptor node 102 to an energy level "X2", while the acceptor node 102 was parked at the location "FNU" on Monday, Wednesday, and Friday in the past. In one example, on a next Monday, if the energy level of the acceptor node 102 is detected to be "X1" when parked at the location "FNU", the application server 116 may be configured to automatically initiate or prompt a charging request for charging the acceptor node 102 at the location "FNU" to achieve the energy level "X2". In another example, on a next Monday, if the energy level of the acceptor node 102 is detected to be "X1" when parked at the location "FNU", the application server 116 may be configured to communicate a reminder to the user via the service application being executed on the user device 105a to initiate a charging request for charging the acceptor node 102 to achieve the energy level "X2".

In another exemplary scenario, the behavioral data collected for the acceptor node 102 may indicate that the user of the acceptor node 102 prefers to maintain the energy level of the acceptor node 102 within a first range. Therefore, in one example, the application server 116, based on the behavioral data, may be configured to automatically initiate a charging request for the acceptor node 102 when the energy level reaches a bottom level of the first range. In another example, if the application server 116 detects that the current energy level of the acceptor node 102 has reached the bottom level of the first range, the application server 116 may communicate a reminder to the user via the service application being executed on the user device 105a to initiate a charging request for charging the acceptor node 102.

The behavioral data for the acceptor node 102 may further include a preferred turn-around time specified by the user for charging the acceptor node 102, a preferred cost specified by the user for charging the acceptor node 102, a preferred charging rate specified by the user for charging the acceptor node 102, or the like.

The abovementioned behavioral data is collected for the acceptor node 102 that is a vehicle and is mobile. The behavioral data for the acceptor nodes 104 and 106 that are non-mobile (i.e., places and buildings) may be different from the behavioral data for the acceptor node 102. The behavioral data for the acceptor nodes 104 and 106 may include a time of charging, a preferred range of charging, and a desired energy level of charging of the acceptor nodes 104 and 106.

Figure 4:
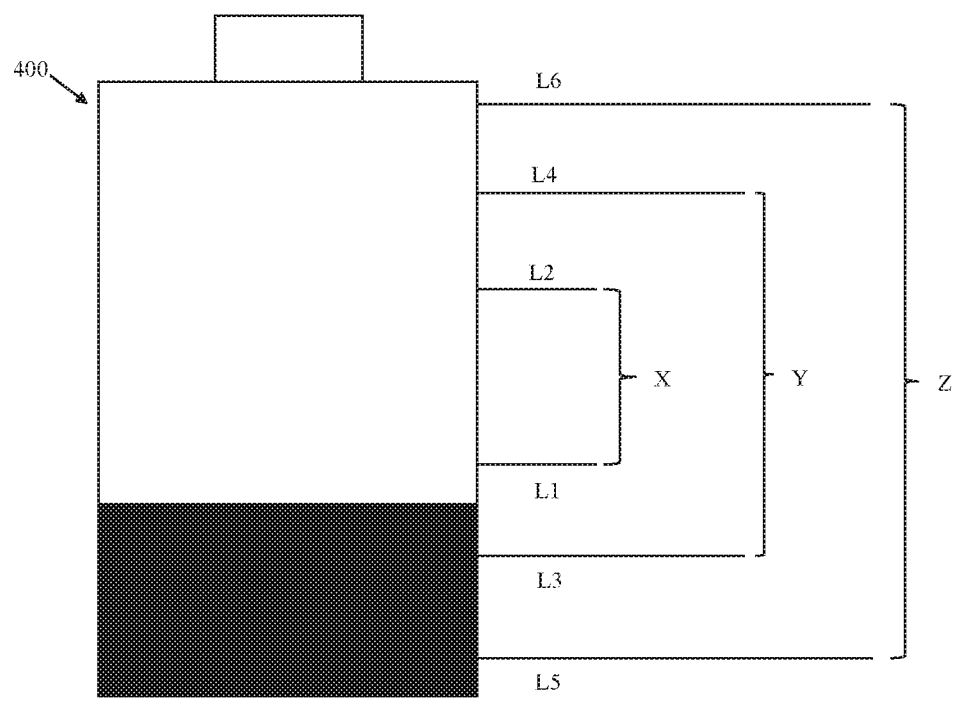
FIG. 4 is a schematic diagram that illustrates health optimization criteria associated with a chargeable energy storage device, in accordance with an exemplary embodiment of the present disclosure.

FIG. 4 is a schematic diagram that illustrates health optimization criteria associated with a chargeable energy storage device 400, in accordance with an exemplary embodiment of the present disclosure. The energy storage device 400 may be any of the plurality of energy storage devices 103a-103c of the plurality of acceptor nodes 102-106 or the charging device of the plurality of mobile charging systems 108 and 110. The health optimization criteria ensure that the energy storage device 400 is always charged in a charging range that is optimal for maintaining good health and longevity of the energy storage device 400.

The energy storage device 400 is shown to have a plurality of charging levels L1, L2, L3, L4, L5, and L6. The plurality of charging levels L1-L6 form a plurality of charging ranges X, Y, and Z for the energy storage device 400. The charging range X refers to a range of charging the energy storage device 400 between the charging levels L1 and L2, the charging range Y refers to a range of charging the energy storage device 400 between the charging levels L3 and L4, and the charging range Z refers to a range of charging the energy storage device 400 between the charging levels L5 and L6.

Charging the energy storage device 400 in the charging range X may be the most optimal charging criterion for the energy storage device 400. In other words, charging the energy storage device 400 in the charging range X may ensure good health and increased lifespan of the energy storage device 400. In one example, when the charge of a charging device of a mobile charging system (e.g., the plurality of mobile charging systems 108 and 110) is maintained in the charging range X, it may ensure good health and increased lifespan for the charging device, and thereby increasing the profitability for the fleet manager of the plurality of mobile charging systems 108 and 110. Similarly, when the energy level of an acceptor node (e.g., the plurality of acceptor nodes 102-106) is maintained in the charging range X, it may ensure good health and increased lifespan for an energy storage device of the acceptor node, and thereby increasing the profitability for the users of the respective plurality of acceptor nodes 102-106.

The optimal charging criteria for the energy storage device 400 may vary based on a type of the energy storage device 400, an age of the energy storage device 400, a size of the energy storage device 400, a charge capacity (i.e. capacity to store electric charge) of the energy storage device 400, a region of operation of the energy storage device 400, a configuration of the energy storage device 400, and a make and model of one or more electronic components powered by the energy storage device 400. The environmental conditions (such as humidity, precipitation, temperature, and the like) to which the energy storage device 400 is exposed may affect the health of the energy storage device 400 (while in use or idle). Thus, determining the health optimization criteria of the energy storage device 400 based on the region of operation of the energy storage device 400 ensures that effects of the environmental conditions to which the energy storage device 400 is exposed are considered. The optimal charging criteria for the energy storage device 400 is a charging range within which the energy storage device 400 performs in an optimal manner and have optimal lifespan. Further, the energy storage device 400, when operating in the optimal charging range, exhibits one of a high charge transfer rate for charging the plurality of acceptor nodes 102-106 or a high charging rate to get charged from the plurality of mobile charging systems 108 and 110 as compared to the other charging ranges Y and Z. In an embodiment, a performance of the energy storage device 400 may degrade when it operates outside the charging range X, i.e., in the charging ranges Y and Z.

The application server 116 may be configured to determine the plurality of charging levels L1-L6, and the plurality of charging ranges X, Y, and Z for the energy storage device 400. The application server 116 may determine the plurality of charging levels L1-L6, and the plurality of charging ranges X, Y, and Z based on the type of the energy storage device 400, the age of the energy storage device 400, the size of the energy storage device 400, the capacity of the energy storage device 400, the region of operation of the energy storage device 400, the configuration of the energy storage device 400, and the make and model of the one or more electronic components powered by the energy storage device 400. The plurality of charging levels L1-L6 and the plurality of charging ranges X, Y, and Z may be dynamic in nature. In other words, the plurality of charging levels L1-L6 and the plurality of charging ranges X, Y, and Z may change with respect to time. The plurality of charging levels L1-L6 and the plurality of charging ranges X, Y, and Z may change, during life-span of the energy storage device 400, based on the make and model of the energy storage device 400, the type of the energy storage device 400, the age of the energy storage device 400, the size of the energy storage device 400, the charge capacity (i.e. capacity to store electric charge) of the energy storage device 400, the region of operation of the energy storage device 400, the configuration of the energy storage device 400, the make and model of the one or more electronic components powered by the energy storage device 400, an age of the of one or more electronic components, and a configuration of the one or more electronic components.

In one embodiment, the charging range X may be optimal for health of one of the energy storage device 103a and the acceptor node 102. In another embodiment, the charging range Y may be preferable for health of one of the energy storage device 103a and the acceptor node 102. In another embodiment, the charging range Z may be suboptimal for health of one of the energy storage device 103a and the acceptor node 102.

In another embodiment, the health optimization criteria of the energy storage device 400 may indicate that when available charge in the energy storage device 400 is at charging level L1, the energy storage device 400 should be charged up to level L6. Further, the health optimization criteria of the energy storage device 400 may indicate that when available charge in the energy storage device 400 is at charging level L3, the energy storage device 400 should be charged up to level L2.

Further, health optimization criteria of the energy storage device 400 may indicate that when available charge in the energy storage device 400 is at charging level L1, the energy storage device 400 requires a first charging rate to get charged. The health optimization criteria of the energy storage device 400 may further indicate that when available charge in the energy storage device 400 is at charging level L3, the energy storage device 400 requires a second charging rate to get charged.

In an embodiment, the application server 116 may be configured to prompt or remind the user of the acceptor node 102 to charge the energy storage device 103a in the optimal charging range determined for the energy storage device 103a. The application server 116 may prompt or remind the user via the user device 105a, a telematics device of the acceptor node 102, or an OBD device of the acceptor node 102, or a connected car network handled by a third-party server.

In an embodiment, the application server 116 may be configured to incentivize the plurality of users of the plurality of acceptor nodes 102-106 for maintaining the energy level of the plurality of acceptor nodes 102-106 within the optimal charging range. The plurality of users may be incentivized by offering discounted charging rates or cost, gift vouchers, discount coupons, offering extra charging of the plurality of acceptor nodes 102-106, or the like. In another embodiment, the application server 116 may be configured to incentivize the drivers of the plurality of mobile charging systems 108 and 110 for maintaining the state of charge of the corresponding plurality of mobile charging systems 108 and 110 within the optimal charging range. The drivers are incentivized by offering bonus, paid leaves, good review, or the like. Beneficially, such incentivization by the application server 116 ensures good health, prolonged life, and better performance of the plurality of acceptor nodes 102-106 and the plurality of mobile charging systems 108 and 110.

Hereinafter, the terms health optimization criteria of an acceptor node and health optimization criteria of an energy storage device of the acceptor node are interchangeably used. Further, the terms "health optimization criteria of a mobile charging system" and "health optimization criteria of a charging device of the mobile charging system" are interchangeably used.

Figure 5:
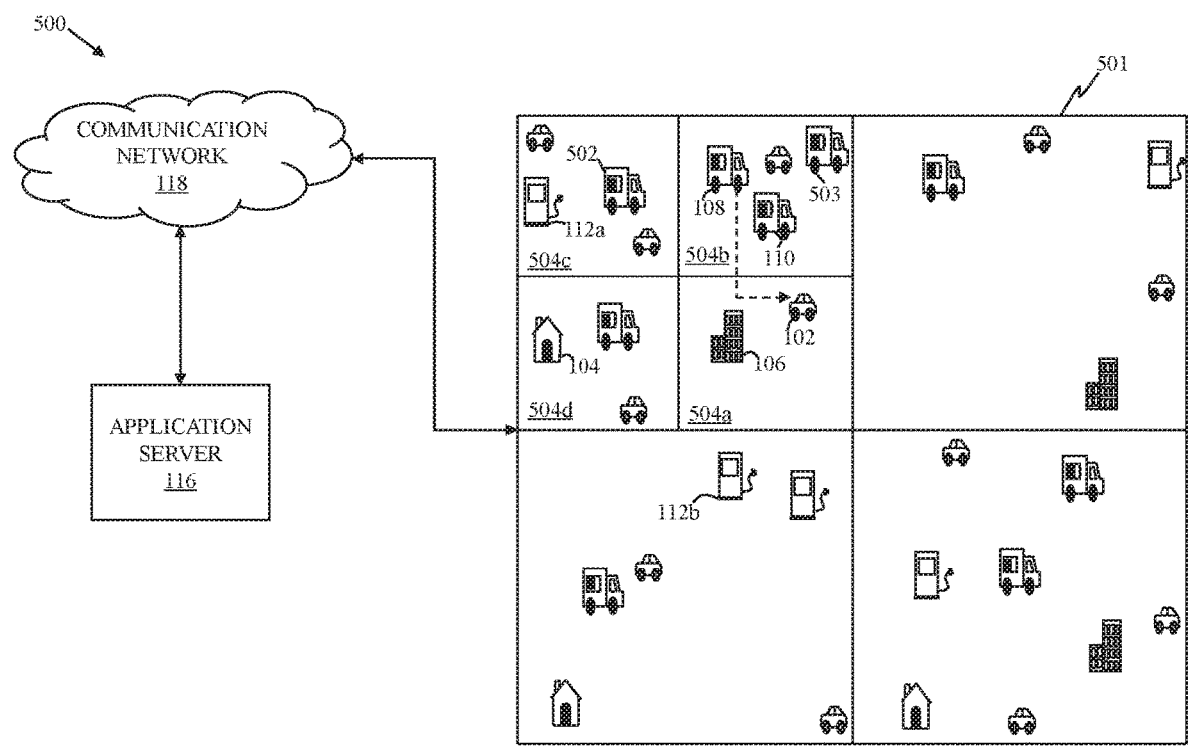
FIG. 5 is a schematic diagram that illustrates an exemplary scenario for facilitating charging of an acceptor node by a mobile charging system, in accordance with an exemplary embodiment of the present disclosure.

FIG. 5 is a schematic diagram that illustrates an exemplary scenario 500 for facilitating charging of the acceptor node 102 by a mobile charging system, in accordance with an exemplary embodiment of the present disclosure.

The application server 116 may be configured to host the service application. The plurality of user devices 105a-105c, the plurality of driver devices 109a and 109b, and the plurality of charging stations 112a and 112b may be configured to execute the service application hosted by the application server 116. The application server 116 may be further configured to collect the data from the plurality of user devices 105a-105c, the plurality of driver devices 109a and 109b, and the plurality of charging stations 112a and 112b as described in FIGS. 2 and 3. For example, the application server 116 may collect the energy level data and the location data of the plurality of acceptor nodes 102-106 from the corresponding plurality of user devices 105a-105c. The application server 116 may further collect the state of charge data and the location data of the plurality of mobile charging systems 108 and 110 from the corresponding plurality of driver devices 109a and 109b.

In a non-limiting example, it is assumed that the plurality of acceptor nodes 102-106, the plurality of mobile charging systems 108 and 110, and the plurality of charging stations 112a and 112b are located within a geographical region 501. The geographical region 501 may further include other mobile charging systems, such as mobile charging systems 502 and 503. The application server 116 may be configured to segregate the geographical region 501 into a grid having multiple cells, such as 504a, 504b, 504c, and 504d, or the like. A size of each cell is determined based on a level of optimization to be achieved by the application server 116.

In an embodiment, the application server 116 may be further configured to deploy the plurality of mobile charging systems 108 and 110 in the geographical region "P" based on historical charging demand observed at different timeslots. Further, the application server 116 may be configured to deploy the plurality of mobile charging systems 108 and 110 in the geographical region "P" based on a foreseen frequency of charging requests (i.e., expected charging demand) during different timeslots. In an example, the application server 116 may increase a larger number of deployed mobile charging systems in the cell 504a during a first timeslot when a high frequency of charging requests is expected in the cell 504a. In another example, the application server 116 may decrease a number of deployed mobile charging systems in the cell 504a during a second timeslot when a low frequency of charging requests is expected in the cell 504a. It will be apparent to a person of ordinary skill in the art that the exemplary scenario 500 illustrates a specific time instance of a timeslot.

Based on the location data received from the plurality of acceptor nodes 102-106, the plurality of mobile charging systems 108 and 110, and the plurality of charging stations 112a and 112b, the application server 116 may be configured to locate the plurality of acceptor nodes 102-106, the plurality of mobile charging systems 108 and 110, and the plurality of charging stations 112a and 112b on the grid. In other words, the application server 116 may generate a grid map of the geographical region "P" and position the plurality of acceptor nodes 102-106, the plurality of mobile charging systems 108 and 110, and the plurality of charging stations 112a and 112b on the generated grid map. Such positioning is performed based on the real-time location data received from the plurality of user devices 105a-105c, the plurality of driver devices 109a and 109b, and the plurality of charging stations 112a and 112b.

The application server 116 may be configured to receive a charging request, for charging the energy storage device 103a, from the user device 105a associated with the acceptor node 102. The charging request may be indicative of the current energy level of the energy storage device 103a of the acceptor node 102. In one embodiment, the charging request may further include payment information associated with the acceptor node 102, a contact information (for example, a phone number) associated with a user of the acceptor node 102, the unique identifier of the acceptor node 102, and a make and a model of the acceptor node 102. The charging request may be further indicative of a desired energy level of the acceptor node 102, a charging capacity of the energy storage device 103a, a desired charging rate of the energy storage device 103a, a maximum charging rate of the energy storage device 103a, and a turn-around time for achieving the desired energy level of the energy storage device 103a. The desired energy level of the energy storage device 103a may indicate an amount (for example, a ratio, a percentage, a range, or the like) of electric charge that should be stored in the energy storage device 103a to consider the charging complete. The charging capacity of the energy storage device 103a may be a maximum amount of charge that can be received by the energy storage device 103a. The charging capacity may be determined based on a difference between maximum charge storage capacity of the energy storage device 103a and the current energy level of the energy storage device 103a. The desired charging rate of the energy storage device 103a may indicate a pace or speed at which the energy storage device 103a is desired to be charged based on a desired charging time, a cost of charging, and a location of charging. In an example, the desired charging rate of the energy storage device 103a may be one of fast charging or slow charging. The turn-around time for achieving the desired energy level may correspond to a time interval between the generation of the charging request and the completion of the charging of the energy storage device 103a to the desired energy level. In other words, the turn-around time for achieving the desired energy level refers to a cumulative time required for an allocated mobile charging system to reach the acceptor node 102 and charge the energy storage device 103a.

In one embodiment, the charging request may be generated/initiated via a third-party application (for example, Alexa® application, Google Assistant®, or the like) being executed on the user device 105a or the telematics device of the acceptor node 102. Further, a payment for charging the acceptor node 102 may be processed via a third-party application for example, but not limited to, WhatsApp Pay®, Google Pay®, Amazon Pay®, or the like.

In another embodiment, the application server 116 may have a charge request generator module that may be trained using machine learning techniques such as k-means algorithm, decision tree algorithm, neural network, or the like. The charge request generator module that may be trained based on the user preference, health optimization criteria, and behavioral data. The trained charge request generator module may be configured to initiate the charging request for charging the acceptor node 102 automatically i.e., without human intervention based on one of the current energy level of the acceptor node 102, the health optimization criteria for the energy storage device 103a, the user preference, the user behavior, historical data for past charging sessions, and the like.

In an embodiment, the application server 116 may be configured to create a user profile associated with the user device 105a. The user profile is created when a charging request is received from the user device 105a for the first time or when the service application is installed or accessed on the user device 105a by the user. The application server 116 may be configured to store the user profile in the database 114. The user profile may store information associated with the user of the user device 105a and the energy storage device 103a associated with the user device 105a. In an embodiment, the user profile may store user preferences of the user of the user device 105a, such as a preferred time of day for charging the energy storage device 103a, a desired energy level to be achieved for the energy storage device 103a, a desired location for charging the energy storage device 103a, an affordable cost for charging the energy storage device 103a, a health status of the energy storage device 103a, health optimization criteria for charging the energy storage device 103a, a configuration of the energy storage device 103a, a charging history of the energy storage device 103a, and/or an energy level or range of electric charge at which the energy storage device 103a has been charged in the past.

In another instance, the application server 116 may be configured to receive, from the user device 105a associated with the acceptor node 102, energy level data of the acceptor node 102. The energy level data may indicate a current energy level of the acceptor node 102. The application server 116 may not perform any operation if the current energy level of the acceptor node 102 is more than or equal to the first threshold value. However, in one embodiment, the application server 116 may be configured to automatically initiate the charging request for charging the energy storage device 103a based on the detection that the current energy level is less than the first threshold value and a consent of the corresponding user. In an embodiment, the first threshold value may be same or different for different energy storage devices, e.g., the plurality of energy storage devices 103a-103c. Further, the first threshold value may be dynamic in nature and may tend to change during life time of the energy storage device 103a. For example, when the energy storage device 103a is new, the first threshold value may be X %. Further, as the energy storage device ages, the first threshold value may decrease to Y %. The first threshold value may correspond to an energy level at which the energy storage device 103a is required to be charged. In an embodiment, the first threshold value may be defined by the user associated with the user device 105a. In another embodiment, the first threshold value may be determined by the application server 116 based on the health optimization criteria of the energy storage device 103a. The health optimization criteria may include one or more constraints defined for maintaining a good health and longevity of the energy storage device 103a. The health optimization criteria may be same or different for different energy storage devices (e.g., the plurality of energy storage devices 103a-103c). The health optimization criteria may be dynamic in nature and may tend to change during life time of the energy storage device 103a. In an example, when the energy storage device 103a is new, the health optimization criteria of the energy storage device 103a may include charging of the energy storage device 103a at a first energy level. Further, as the energy storage device 103a ages, the health optimization criteria changes and suggests charging the energy storage device 103a at a second energy level. The second energy level may be smaller than the first energy level. In an embodiment, the health optimization criteria may correspond to a charging range, having lower and upper limits of charge, within which the energy storage device 103a should be charged to ensure longevity and good health. In such embodiment, the first threshold value may be a lower limit of the charging range. In an example, for the energy storage device 103a of 100 kW capacity, an optimal charging range as per the health optimization criteria may be 30 kW. In such a scenario, the first threshold value may be 30 kW and the energy storage device 103a should be charged once the current energy level drops below 30 kW. In another embodiment, the first threshold value may be determined by the application server 116 based on the user preferences of the user associated with the acceptor node 102. For example, the user preferences may include an energy level at which the user chose to charge the energy storage device 103a in the past. In an example, the user may have preferred to charge the energy storage device 103a when it was completely drained. Therefore, the first threshold value may be 0 kW and the charging request for the acceptor node 102 is initiated when the energy level drops to 0 kW. The first threshold value may be further determined by the application server 116 based on the behavioral data associated with historical charging of the energy storage device 103a. The behavioral data may include various energy levels at which the energy storage device 103a was charged in the past. Therefore, the first threshold value may be an average of the various energy levels at which the energy storage device 103a was charged in the past. In other words, the application server 116 initiates the charging request for charging the energy storage device 103a based on the behavioral data associated with the historical charging of the energy storage device 103a and the detection that the current energy level of the acceptor node 102 is less than the first threshold value. In such a scenario, the desired energy level for charging the energy storage device 103a is also determined by the application server 116 based on the behavioral data associated with the historical charging of the energy storage device 103a, user preferences defined by the user, and the health optimization criteria of the energy storage device 103a.

In another embodiment, the user device 105a may be configured to initiate, via the installed service application and without intervention from the corresponding user, the charging request for charging the energy storage device 103a based on the detection that the current energy level is less than the first threshold value. In another embodiment, the application server 116 may communicate a reminder to the user device 105a to notify the user that the current energy level is less than the first threshold value. Based on the reminder, the charging request may be initiated by the user. In another embodiment, the application server 116 may be configured communicate a reminder to the user device 105a to prompt the user based on a predefined value set by the user at which the user wants to be reminded to charge the energy storage device 103a. Based on the reminder, the charging request may be initiated by the user.

The application server 116 may be further configured to determine the set of charging parameters for the acceptor node 102 (i.e., the energy storage device 103a) based on the charging request. The set of charging parameters may include the amount of charge required to charge the energy storage device 103a (shown in FIG. 1) of the acceptor node 102, the turn-around time for achieving the desired energy level, the desired charging rate of the energy storage device 103a (shown in FIG. 1) of the acceptor node 102, and the maximum charging rate of the energy storage device 103a. In an example, the acceptor node 102 may require 40 kW of charge, the turn-around time may be 80 minutes, the desired charging rate may be at 60 kW, and the maximum charging rate may be 30 kW.

The application server 116 may further determine the set of charging parameters based on the information stored in the user profile associated with the acceptor node 102. The set of charging parameters may be further determined based on the user preferences of the user of the user device 105a. The application server 116 may further determine the set of charging parameters based on the behavioral data associated with the historical charging of the energy storage device 103a.

Upon determining the set of charging parameters, the application server 116 may be configured to identify the plurality of mobile charging systems 108 and 110 that are available within the first geographical region associated with the acceptor node 102 and satisfy the set of charging parameters for the energy storage device 103a. The application server 116 may be configured to locate, based on the location data of the user device 105a, a cell in the grid map where the acceptor node 102 is present. As shown in FIG. 5, the acceptor node 102 is present in the cell 504a. The application server 116 then searches in the cell 504a for various mobile charging systems that satisfy the set of charging parameters of the energy storage device 103a.

However, the application server 116 may determine that 504a cell does not include any mobile charging system that satisfies the set of charging parameters of the energy storage device 103a. Therefore, the application server 116 may expand the search region to include the cell 504b. The application server 116 may then identify that the cell 504b includes three mobile charging systems 108, 110, and 503. The application server 116 may be configured to identify those mobile charging systems 108, 110, and 503 in the cell 504b that satisfy the set of charging parameters of the energy storage device 103a. For example, the application server 116 may identify that the plurality of mobile charging systems 108 and 110 satisfy the set of attributes of the energy storage device 103a and the mobile charging system 503 does not satisfy the set of attributes of the energy storage device 103a. In one example, the mobile charging system 503 may not have sufficient charge required for charging the energy storage device 103a. In another example, the mobile charging system 503 may have a higher turn-around time than required for charging the energy storage device 103a. In another example, the mobile charging system 503 may not offer the charging rate required to charge the energy storage device 103a. In another example, the mobile charging system 503 may have a different configuration than supported by the energy storage device 103a for charging. Thus, the application server 116 may discard the mobile charging system 503 and only identifies those mobile charging systems 108 and 110 that satisfy the set of charging parameters of the energy storage device 103a. In other words, the mobile charging systems 108 and 110 that are identified have sufficient charge required for charging the energy storage device 103a, a lower or same turn-around time required for charging the energy storage device 103a, offer the same or a higher charging rate required to charge the energy storage device 103a, and have the same configuration as supported by the energy storage device 103a for charging.

After identifying the mobile charging systems 108 and 110, the application server 116 may be configured to rank the identified mobile charging systems 108 and 110 in an order (ascending order or descending order). The identified mobile charging systems 108 and 110 may be ranked in the order based on the health optimization criteria of the charging device of each identified mobile charging system 108 and 110. The health optimization criteria of the charging device may include one or more constraints defined for maintaining a good health of the charging device of each identified mobile charging system 108 and 110. The health optimization criteria may be same or different for different charging devices. The health optimization criteria may be dynamic in nature and may tend to change during life time of the identified mobile charging systems 108 and 110. In an embodiment, the health optimization criteria of the charging device may correspond to a charging range, having lower and upper limits of charge, within which the charging device of the identified mobile charging systems 108 and 110 should be charged to maintain a good health. Therefore, the application server 116 may be configured to rank the identified mobile charging systems 108 and 110 in the order based on the availability of electric charge to retain the health optimization criteria of the charging device after charging the acceptor node 102. In an exemplary scenario, the charging device of the mobile charging system 108 may have an available charge of 80 kW and the health optimization criteria may indicate to retain a minimum charge of 40 kW. Similarly, the charging device of the mobile charging system 110 may have an available charge of 120 kW and the health optimization criteria of the charging device may indicate to retain a minimum charge of 30 kW. Thus, upon receiving a charging request for 50 kW, the application server 116 may rank the mobile charging system 110 higher than the mobile charging system 108, as the charging request for 50 kW violates the health optimization criteria of the mobile charging system 108.

The application server 116 may rank the identified mobile charging systems 108 and 110 further based on the charge transfer rate of the charging device of each identified mobile charging system 108 and 110. Each identified mobile charging system 108 and 110 may have different charge transfer rate. For example, the mobile charging system 108 may have a charge transfer rate of 50 kW and the mobile charging system 110 may have a charge transfer rate of 20 kW. For ranking, the application server 116 may compare the maximum charge transfer rate associated with the identified mobile charging systems 108 and 110 with the maximum charging rate of the energy storage device 103a. In an exemplary scenario when the maximum charging rate of the energy storage device 103a is 60 kW, the application server 116 may rank the mobile charging system 108 higher than the mobile charging system 110.

Figures 6A, 6B, 6C:
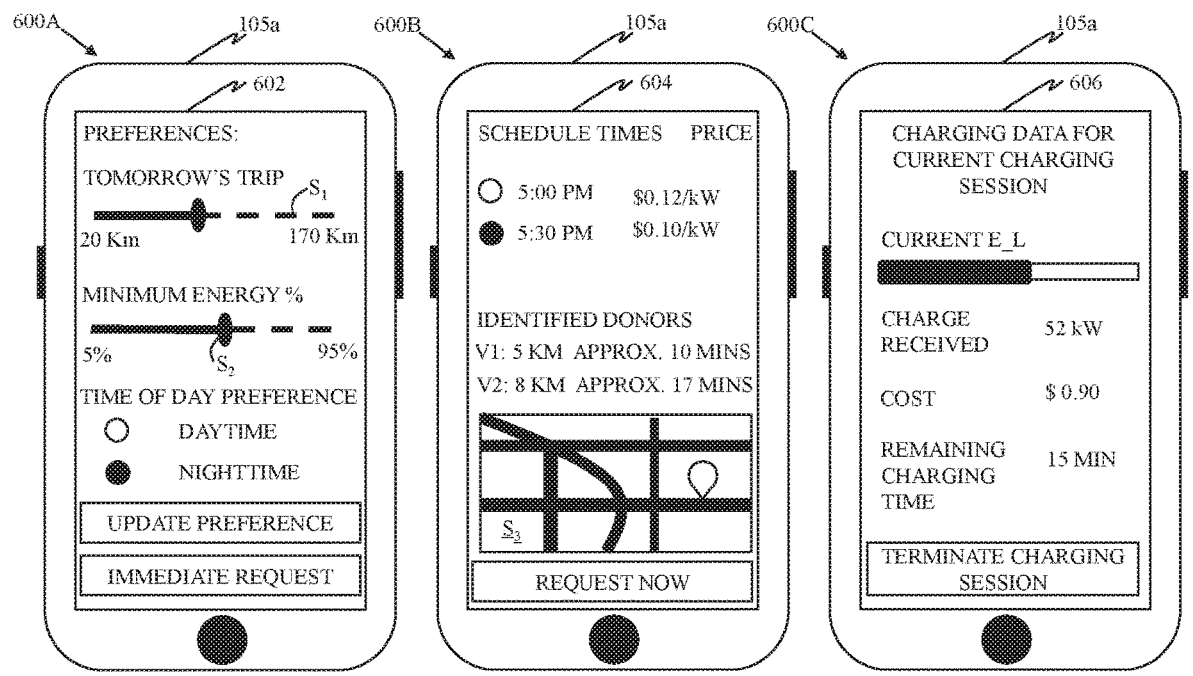
FIGS. 6A, 6B, and 6C are schematic diagrams that illustrate user interfaces rendered by the application server of FIG. 1 on a user device associated with an acceptor node of FIG. 1, in accordance with an exemplary embodiment of the present disclosure.

The application server 116 may rank the identified mobile charging systems 108 and 110 further based on the turn-around time associated with each identified mobile charging system 108 and 110 to charge the energy storage device 103a (as shown in FIG. 6B). The turn-around time for a mobile charging system may be a cumulative sum of the time required by the mobile charging system to travel from a first location (i.e., a current location) to a second location of the acceptor node 102 and the time required by the mobile charging system to charge the energy storage device 103a after reaching the second location. The application server 116 may be configured to determine the turn-around time for each identified mobile charging system 108 and 110. For example, the application server 116 may determine the cumulative sum of the time required by the mobile charging system 108 to travel from the first location (i.e., a current location) to the second location of the acceptor node 102 based on real-time or near real-time traffic congestion along a route between the first location and the second location, a distance between the first location and the second location, a travel speed of the mobile charging system 108, and current environmental conditions (e.g., thunderstorm, rain, and or the like) along the route. Further, the application server 116 may determine the time required by the mobile charging system 108 to charge the energy storage device 103a based on the desired charging rate, the amount of charge required to charge the energy storage device 103a, and the health optimization criteria of the energy storage device 103a. The application server 116 may rank the identified mobile charging systems 108 and 110 in an order of increasing turn-around time, i.e., the mobile charging system with minimum turn-around time is ranked highest and the mobile charging system with maximum turn-around time is ranked lowest. The application server 116 may rank the identified mobile charging systems 108 and 110 further based on an estimated time of arrival at the second location from corresponding first location. For example, the application server 116 may rank the identified mobile charging systems 108 and 110 in an order of increasing estimated time of arrival, i.e., the mobile charging system with minimum estimated time of arrival is ranked highest and the mobile charging system with maximum estimated time of arrival is ranked lowest.

The application server 116 may rank the identified mobile charging systems 108 and 110 further based on the cost associated with each identified mobile charging system 108 and 110 to charge the energy storage device 103a. For example, the application server 116 may rank the identified mobile charging systems 108 and 110 in an order of increasing cost, i.e., the mobile charging system with minimum cost is ranked highest and the mobile charging system with maximum cost is ranked lowest.

In an embodiment, the application server 116 may be configured to rank the identified mobile charging systems 108 and 110 in the order based on a combination of the abovementioned factors i.e. the health optimization criteria, the charge transfer rate, the turn-around time, and the cost of charging. The application server 116 may be further configured to present the ranked list of the identified mobile charging systems 108 and 110 to the user, via the user interface of the user device 105a (as shown in FIG. 6B).

The application server 116 may be configured to allocate one of the ranked mobile charging systems 108 and 110 to the acceptor node 102 for charging. In one embodiment, the application server 116 may allocate one of the ranked mobile charging systems 108 and 110 based on the ranking. For example, the application server 116 may allocate the mobile charging system 108 that has the highest rank to charge the acceptor node 102. Beneficially, such optimal allocation based on ranking ensures optimal utilization of the plurality of mobile charging systems 108 and 110, and also increases profitability to the fleet manager. In another embodiment, the application server 116 may allocate one of the ranked mobile charging systems 108 and 110 to the acceptor node 102 for charging based on the user preference of the user of the acceptor node 102. For example, the user of the acceptor node 102 may select the mobile charging system 108 from the ranked identified mobile charging systems 108 and 110 for charging the acceptor node 102.

The application server 116 may be further configured to communicate an allocation notification to the mobile charging system 108 by way of the driver device 109a. The allocation notification may include information pertaining to the second location of the acceptor node 102 and the unique identifier of the acceptor node 102. The mobile charging system 108 may communicate an allocation response to the application server 116 by way of the driver device 109a to indicate an acceptance or rejection of the charging request by the driver of the mobile charging system 108. In one example, the mobile charging system 108 may not communicate the allocation response within a specific time interval (for example, 30 seconds, 60 seconds, 2 minutes, or the like). In such a scenario, the application server 116 may be configured to communicate the allocation notification again to the mobile charging system 108. The application server 116 may resend the allocation notification to the mobile charging system 108 for a fixed number of times such as 2, 3, 4, 5, or the like. However, when no allocation response is received from the mobile charging system 108 after the fixed number of attempts or the charging request is rejected by the driver of the mobile charging system 108, the application server 116 may communicate a new allocation notification to the other identified mobile charging system 110. The other mobile charging system 110 may be next in ranking to the mobile charging system 108.

In one embodiment, the application server 116 may be configured to communicate a confirmation response to the user device 105a of the acceptor node 102. The confirmation response includes a unique identifier of the mobile charging system 108 and the real-time location of the mobile charging system 108. The confirmation notification may be further indicative of real-time location tracking information associated with the mobile charging system 108. Beneficially, the real-time location tracking information allows the user of the user device 105a to track and monitor the arrival of the mobile charging system 108 at the second location. In one embodiment, the application server 116 may be configured to communicate an arrival notification, upon arrival of the mobile charging system 108 at the second location, to the user of the acceptor node 102 via the user device 105a.

The application server 116 may be further configured to display, via the user interface on the user device 105a while the energy storage device 103a is being charged by the mobile charging system 108, a real-time energy level of the acceptor node 102, a unit of charge received by the energy storage device 103a from the mobile charging system 108, an estimated cost of charging the energy storage device 103a, and a remaining time to charge the energy storage device 103a to the desired energy level. The user of the user device 105a may track the real-time charging of the energy storage device 103a through the user interface. The user of the user device 105a may track the amount of charge received from the mobile charging system 108 based on the unit of charge received by the energy storage device 103a from the mobile charging system 108. Further, the user of the user device 105a may track the estimated cost of charging the energy storage device 103a. Beneficially, the user may decide to terminate or continue the charging based on the estimated cost of charging. Further, the user may schedule or plan subsequent tasks based on the remaining time to charge the energy storage device 103a to the desired energy level. For example, the remaining time may be 10 minutes to charge the energy storage device 103a to the desired energy level. Therefore, the user associated with the acceptor node 102 may plan to leave for a doctor's appointment after 10 minutes.

In an embodiment, the application server 116 may be configured to enable the mobile charging system 108 to access a charging inlet of the acceptor node 102 for charging the acceptor node 102. For example, the application server 116 may enable the user to remotely control an access to the charging inlet of the energy storage device 103a via the service application running on the user device 105a. In another embodiment, the application server 116 may be configured to provide a password, via the driver device 109a of the mobile charging system 108 to unlock the charging inlet. In an embodiment, the application server 116 may be configured to unlock the charging inlet via a cloud-based control for the acceptor node 102. The application server 116 may be further configured to terminate access to the charging inlet upon completion of the charging session for charging the energy storage device 103a.

In another embodiment, the application server 116 may be configured to receive a request for powering one or more electronic components of a building. In such embodiment, the plurality of mobile charging systems 108 and 110 may include a direct current to alternate current (DC to AC) convertor/invertor for providing AC current to the one or more electric components of the building. Further, the plurality of mobile charging systems 108 and 110 may include an inverter or generator for proving AC current to the one or more electric components. Further, the plurality of mobile charging systems 108 and 110 may power the one or more electric components based on time duration or amount of electric charge required by the one or more electric components.

In another embodiment, the application server 116 may be configured to receive a request for draining the energy storage device 103a of the acceptor node 102. For example, the user of the acceptor node 102 may be leaving for a long holiday and in order to prevent degradation of the energy storage device 103a, the request for draining the energy storage device 103a may be initiated by the user via the user device 105a. Similar to the process described earlier, the application server 116 may be configured to allocate a mobile charging system (e.g., any of the mobile charging systems 108, 110, 502, and 503), having a vacant charge capacity that is enough to drain the energy storage device 103a, to the acceptor node 102. The user upon returning from the holiday may initiate the charging request for charging the energy storage device 103a. The user may get the energy storage device 103a charged at a discounted price, or may be charged only for storage of the drained charge.

In an embodiment, based on the state of charge data received from the plurality of driver devices 109a and 109b, the application server 116 may be configured to identify whether state of charge of any of the mobile charging systems 108, 110, 502, and 503 has dropped below a second threshold value. In one example, the second threshold value may be a charge level at which the charging device of the mobile charging systems 108, 110, 502, and 503 should be charged to maintain the state of charge within the optimal range. Examples of the second threshold value may include 20 kW, 30 kW, 40 kW, and so forth. The application server 116 may determine the second threshold value in a manner that the mobile charging systems 108, 110, 502, and 503 maintain its state of charge in accordance with the corresponding health optimization criteria or preferences of the corresponding driver.

In a non-limiting example, the application server 116 identifies that the state of charge of the mobile charging system 502 has dropped below the second threshold value.

The application server 116, based on the stored location data of the mobile charging system 502, identifies that the mobile charging system 502 is located in T cell of the geographical area P. The application server 116 may be configured to identify one of the plurality of charging stations 112a and 112b, which satisfies (or matches) the requirements to charge the mobile charging system 502, as the optimal charging station for charging the mobile charging system 502. In other words, the optimal charging station is identified based on a match between the state of charge of the mobile charging system 502 and the second threshold value. In one example, the optimal charging station is identified based on a drop in the state of charge of the mobile charging system 502 up to the second threshold value. In another example, the optimal charging station is identified based on a drop in the state of charge of the mobile charging system 502 below the second threshold value.

The application server 116 may further identify the optimal charging station based on the availability and status of each charging station 112a and 112b. For example, the application server 116 identifies the optimal charging station that is available. In other words, the application server 116 discards those charging stations that are already in use or out of order. The application server 116 may further identify the optimal charging station based on the turn-around charging time associated with each charging station 112a and 112b. Turn-around charging time may include cumulative time required for the mobile charging system 502 to reach the optimal charging station and charge at the optimal charging station. For example, the optimal charging station for the mobile charging system 502 is identified based on a smallest turn-around charging time. The application server 116 may further identify the optimal charging station based on the cost associated with charging the mobile charging system 502 at each charging station 112a and 112b. The cost associated with charging may vary based on a charging fare of each charging station 112a and 112b and an amount of charge required by the mobile charging system 502. In one embodiment, the charging fare associated with each charging station 112a and 112b is a fixed amount per unit charge. In another embodiment, the charging fare associated with each charging station 112a and 112b may be dynamic and may vary based on a day and time of charging the mobile charging system 502 and a location of each charging station 112a and 112b. For example, the charging station 112a may have a lower charging fare at night in comparison to day time. In one example, the optimal charging station is identified based on lowest charging cost. The application server 116 may further identify the optimal charging station based on the charging rate for charging the mobile charging system 502 at each charging station 112a and 112b. For example, the mobile charging system 502 may be associated with a location that has a high frequency of charging requests. Thus, the application server 116 may identify the optimal charging station that has a higher charging rate (e.g., fast charging) in spite of a higher cost of the fast charging. The application server 116 may be further configured to identify the optimal charging station based on the configuration of the mobile charging system 502. In other words, the optimal charging station is identified in a manner that the optimal charging station is compatible with charging requirements of the mobile charging system 502.

It will be apparent to a person of ordinary skill in the art that the optimal charging station may be identified based on any combination of the abovementioned factors, without deviating from the scope of the disclosure. In a non-limiting example, it is assumed that the application server 116 identifies the charging station 112a as the optimal charging station for the mobile charging system 502. The application server 116 may be further configured to communicate an instruction to the mobile charging system 502 to reach the charging station 112a for charging. Based on the instruction, the mobile charging system 502 reaches the charging station 112a and is charged.

In one embodiment, the application server 116 may be configured to receive a charging request from the driver device 109a, associated with the mobile charging system 108. The charging request may be indicative of a current state of charge (i.e. remaining electric charge in the charging device) of the mobile charging system 108.

It will be apparent to a person of ordinary skill in the art that FIG. 5 depicts placing and positions of the plurality of mobile charging systems 108 and 110 and the plurality of acceptor nodes 102-106 at one instance of time. However, the placing and positions of the plurality of mobile charging systems 108 and 110 and the plurality of acceptor nodes 102-106 may vary at other instances of time.

FIGS. 6A, 6B, and 6C are schematic diagrams 600A, 600B, and 600C that illustrate user interfaces 602, 604, and 606 rendered by the application server 116 on the display of the user device 105a, in accordance with an exemplary embodiment of the disclosure.

With reference to FIG. 6A, the user interface 602 is rendered on the display of the user device 105a for obtaining the user preference from the user of the user device 105a. Similar user interfaces may be rendered on displays of the user devices 105b and 105c for obtaining user preferences from the corresponding users, without deviating from the scope of the disclosure. The user interface 602 includes a slider scale $S_1$ for adjusting a unit of distance to be travelled in the acceptor node 102 next day. The user interface 602 further includes another slider scale S2 for adjusting a minimum energy level at which the energy storage device 103a should be charged. The user interface 602 further includes a time of day preference field associated with radio buttons. The radio buttons associated with day time and night time may be selected based on input received from the user. The user interface 602 further includes a button "UPDATE PREFERENCE" using which the preferences submitted by the user may be updated. The user interface 602 further includes a button "IMMEDIATE REQUEST", which upon selection initiates the charging request for charging the plurality of acceptor node 102.

In one embodiment, the user interface may be configured to receive input, regarding the user preferences, from the user based on a manual entry via a touchscreen or a keyboard, a touch and/or scroll input, a voice input, a movement based input (for example, shaking a user device (e.g., the user device 105a) left and right to increment or decrement the desired energy level), or the like.

With reference to FIG. 6B, the user interface 604 is rendered on the display of the user device 105a to present the mobile charging systems 108 and 110 (i.e., identified donors V1 and V2) ranked by the application server 116 to the user. The user interface 604 includes a list of time slots and corresponding cost for charging the acceptor node 102. The user interface 604 further includes a list of the ranked mobile charging systems 108 and 110 (i.e., the list of nearest donor nodes), corresponding distances from the acceptor node 102, and corresponding travel times to reach the acceptor node 102. The user interface 604 further includes a location tracking section S3 (for example, a street view, a GPS location, a tracking information, and the like) that displays real-time or near real-time location information of the mobile charging system that is selected from the displayed list. The user interface 604 also includes a button "REQUEST NOW" for requesting the selected mobile charging system to charge the energy storage device 103a.

In one embodiment, the user interface 604 may be used, by the user, to override a charging recommendation or prompt by the application server 116, i.e., discard recommendation to charge the energy storage device 103a using the suggested mobile charging systems 108 and 110 at the recommended time slots. The user interface 604 may be further used by the user to initiate a manual "on demand on site" charging request. In other words, the user interface 604 may be used by the user to initiate a manual charging request based on a desired time and location provided by the user.

With reference to FIG. 6C, the user interface 606 is rendered on the display of the user device 105a for displaying, while the energy storage device 103a is being charged by the mobile charging system 108, the real-time energy level of the acceptor node 102, the unit of charge received by the acceptor node 102, the estimated cost of charging the acceptor node 102, and the remaining time to charge the acceptor node 102 to the desired energy level. The user interface 606 displays charging data for a current charging session of the acceptor node 102. The charging data includes the current energy level (E_L) of the acceptor node 102, "52 kW" charge received by the acceptor node 102, "$0.90" incurred for charging the acceptor node 102, and "15 MIN" remaining time for completing the charging to the desired energy level. The user interface 606 further includes a button "TERMINATE CHARGING SESSION" for terminating the current charging session. In an example, the ongoing charging session may be terminated by the user by selecting the button "TERMINATE CHARGING SESSION", before reaching the desired energy level, if the cost of charging till the desired energy level is not affordable for the user.

It will be apparent to a person of ordinary skill in the art that the user interfaces 602-606 are shown for sake of brevity. However, in other embodiments, the user interfaces 602-606 may have additional or different fields and components dedicated to similar or different functionalities.

Figure 7A:
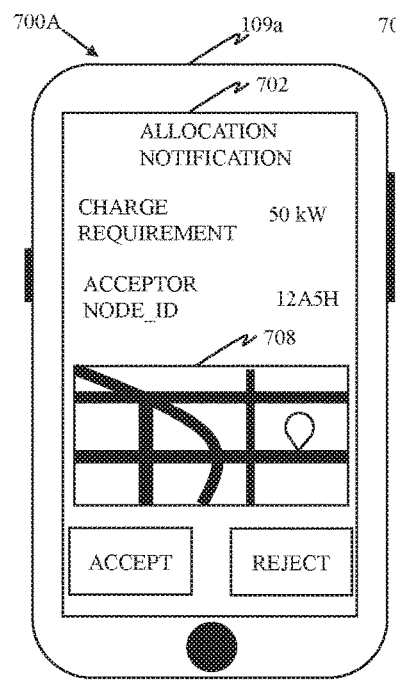
FIGS. 7A, 7B, and 7C are schematic diagrams that illustrate user interfaces rendered by the application server of FIG. 1 on a driver device associated with a mobile charging system, in accordance with an embodiment of the present disclosure.
Figure 7B:
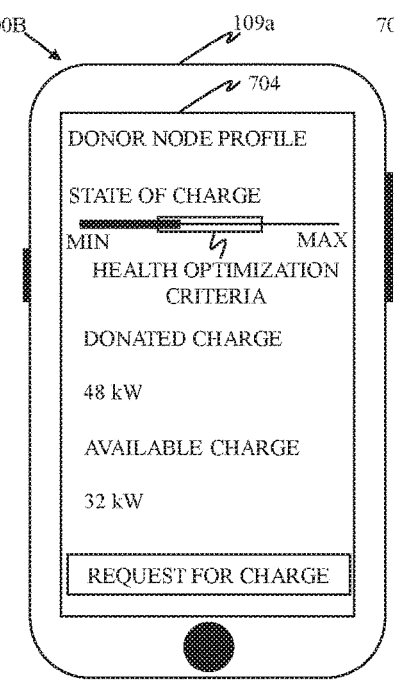
Figure 7C:
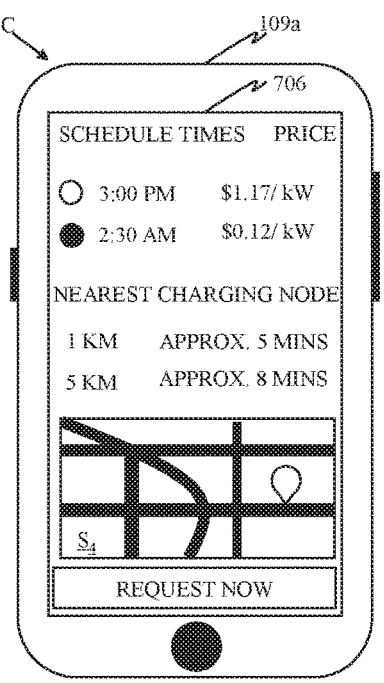

FIGS. 7A, 7B, and 7C are schematic diagrams 700A, 700B, and 700C that illustrate user interfaces 702, 704, and 706 rendered by the application server 116 on the display of driver device 109a, in accordance with an embodiment of the disclosure.

With reference to FIG. 7A, the user interface 702 is rendered on the display of the driver device 109a for displaying the allocation notification communicated by the application server 116. The user interface 702 displays a charge requirement "50 kW" as per the charging request of the acceptor node 102. The user interface 702 further displays the unique identifier "12A5H" associated with the acceptor node 102. Beneficially, the unique identifier allows the driver of the mobile charging system 108 to identify the acceptor node 102 on reaching the second location. Further, the user interface 702 displays real-time or near real-time location and navigation or tracking information 708 for the acceptor node 102. Beneficially, such real-time or near real-time location and navigation or tracking information 708 for the acceptor node 102 allows the driver of the mobile charging system 108 to travel from the first location to the second location without getting lost or confused and wasting unnecessary time. The user interface 702 further displays two buttons "ACCEPT" and "REJECT" for accepting and rejecting the charging request, respectively.

Further, the application server 116, subsequent to communicating the allocation notification, may be configured to provide access to the charging inlet of the acceptor node 102 to the mobile charging system 108. In an embodiment, the application server 116 may be configured to grant access to the charging inlet by communicating a password for unlocking the charging inlet to the driver device 109a. The password may be communicated to the driver device 109a when the driver device 109a is detected to have reached the second location of the acceptor node 102. Further, the application server 116 may be configured to terminate the access to the charging inlet when charging session for charging the acceptor node 102 is completed.

With reference to FIG. 7B, the user interface 704 is rendered on the display of the driver device 109a to present a donor node profile of the mobile charging system 108 to the driver of the mobile charging system 108. The user interface 704 may be used for initiating a request for charging the mobile charging system 108. The user interface 704 may display a current state of charge and the health optimization criteria of the mobile charging system 108. Beneficially, displaying the current state of charge and the health optimization criteria allows the driver to request charging as per the health optimization criteria. The user interface 704 further displays a unit of charge that has been donated by the mobile charging system 108 and a unit of charge that is available with the mobile charging system 108. Further, the user interface 704 displays a button "REQUEST FOR CHARGE" which upon selection initiates a request to charge the mobile charging system 108.

With reference to FIG. 7C, the user interface 706 for displaying a list of charging stations available for charging the mobile charging system 108. The user interface 706 displays a list of time of day of charging and corresponding cost of charging. The user interface 706 further displays distance with available charging stations and travel time required to reach the corresponding charging station. Further, the user interface 706 also displays navigation information in a navigation section S4 to enable the mobile charging system 108 to reach the charging station. The user interface 706 provides for an option "REQUEST NOW" for initiating a request for charge at the optimal charging station.

For the sake of brevity FIGS. 7A-7C are described with respect to the mobile charging system 108. However, in different embodiments the aforementioned description is true for the mobile charging system 110. The user interfaces 702-706 are shown for sake of brevity. However, in other embodiments, the user interfaces 702-706 may have additional or different fields dedicated for similar to different functionalities.

Figure 8:
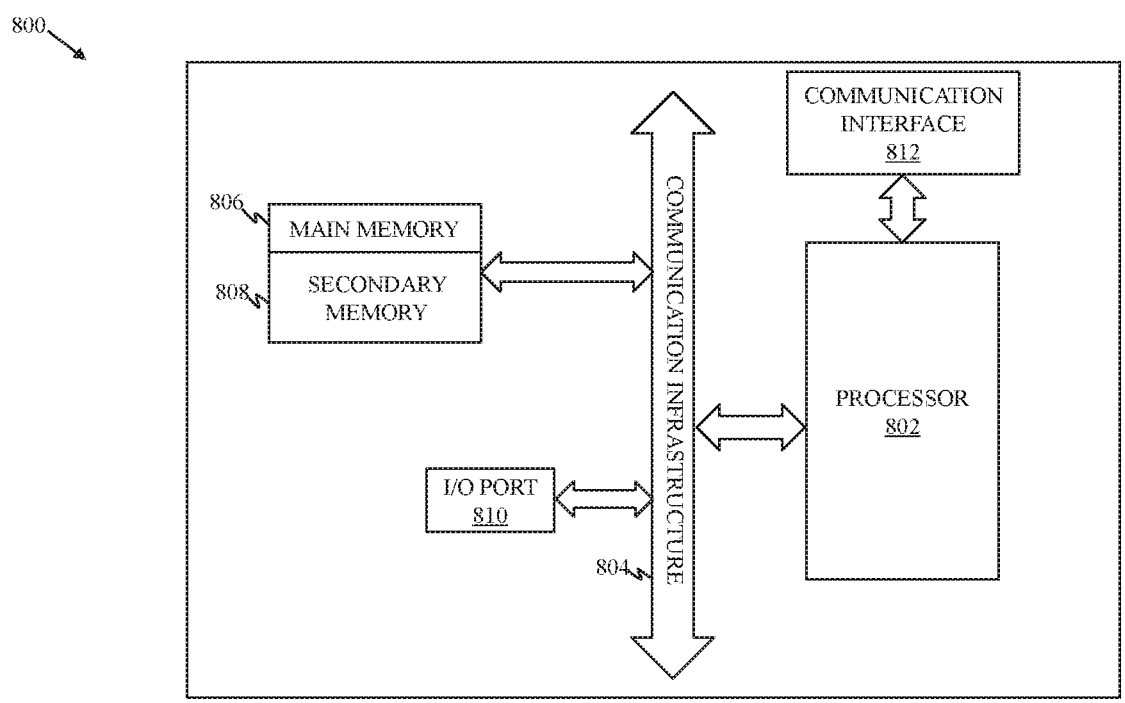
FIG. 8 is a block diagram that illustrates a system architecture of a computer system for facilitating charging of an acceptor node by a mobile charging system, in accordance with an exemplary embodiment of the present disclosure.
Figure 9A:
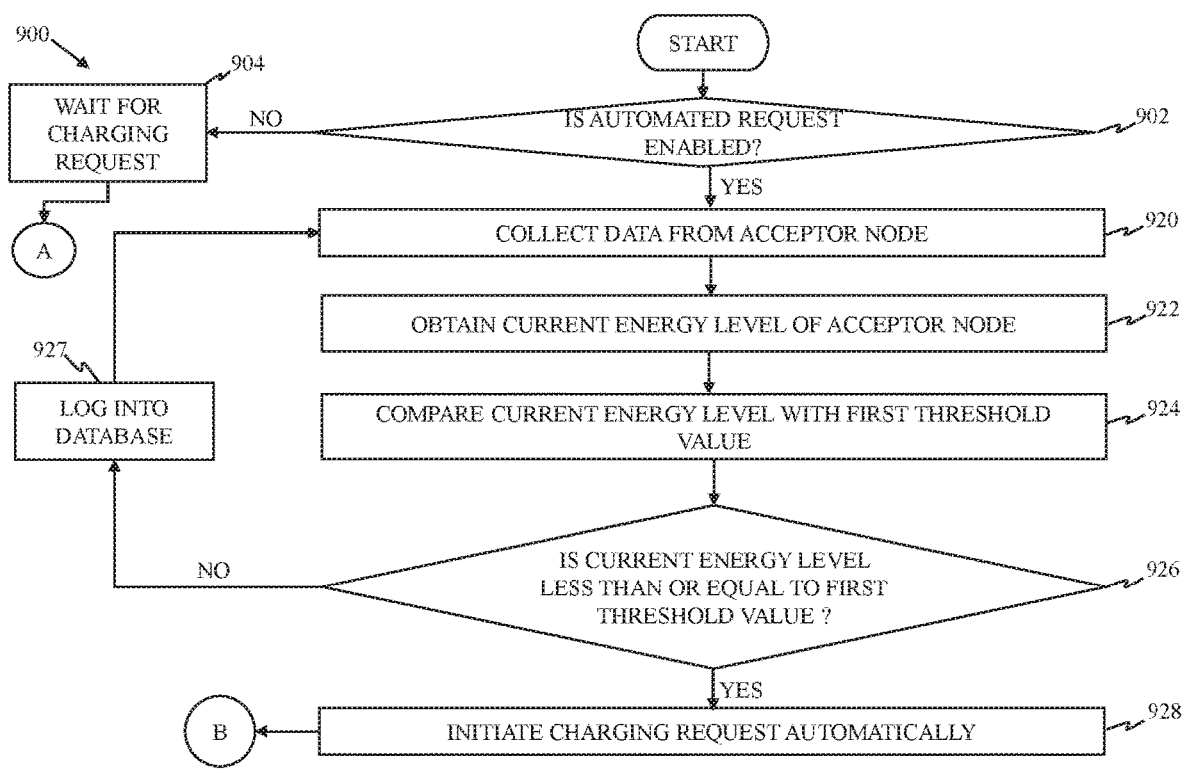
FIGS. 9A-9F, collectively represent a flow chart that illustrates a method for facilitating charging of an acceptor node by a mobile charging system, in accordance with an exemplary embodiment of the present disclosure.
Figure 9B:
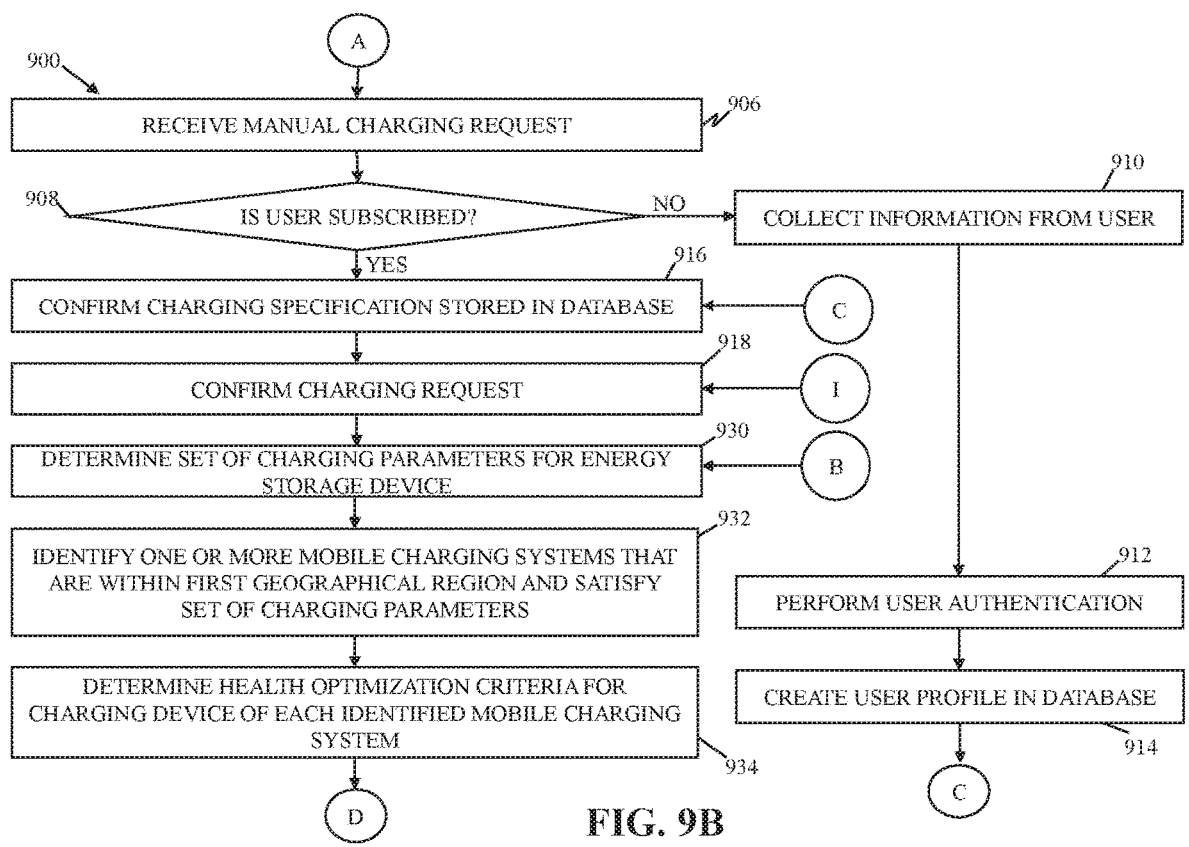
Figure 9C:
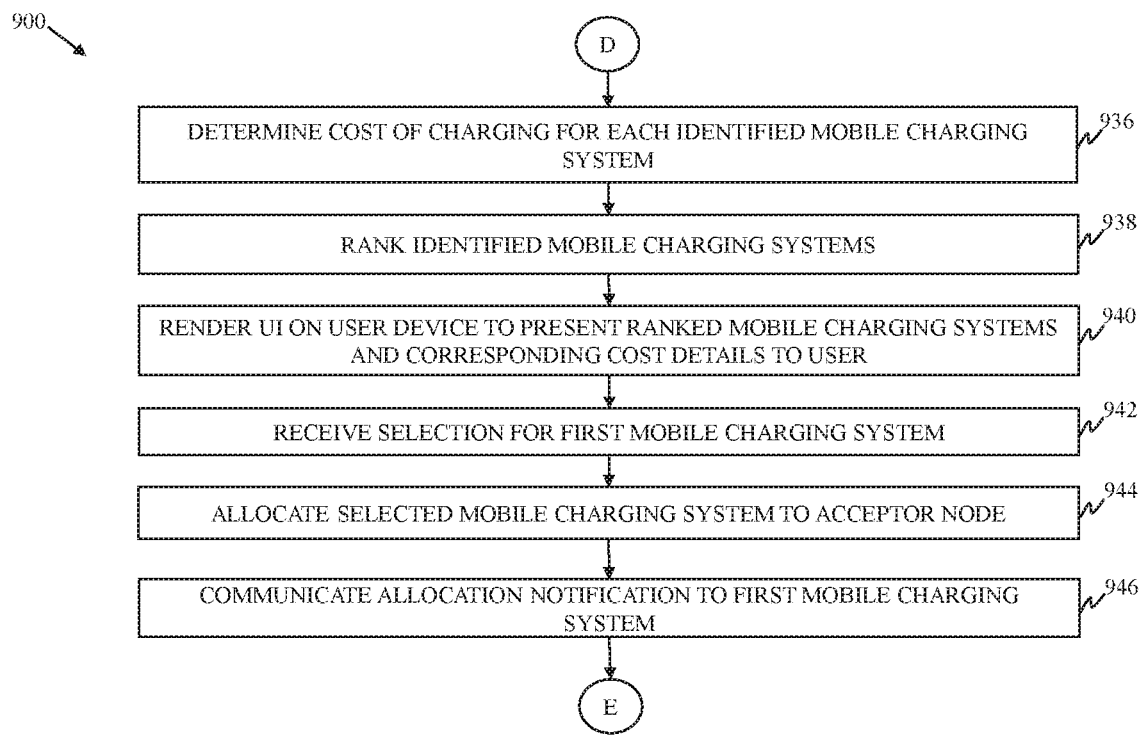
Figure 9D:
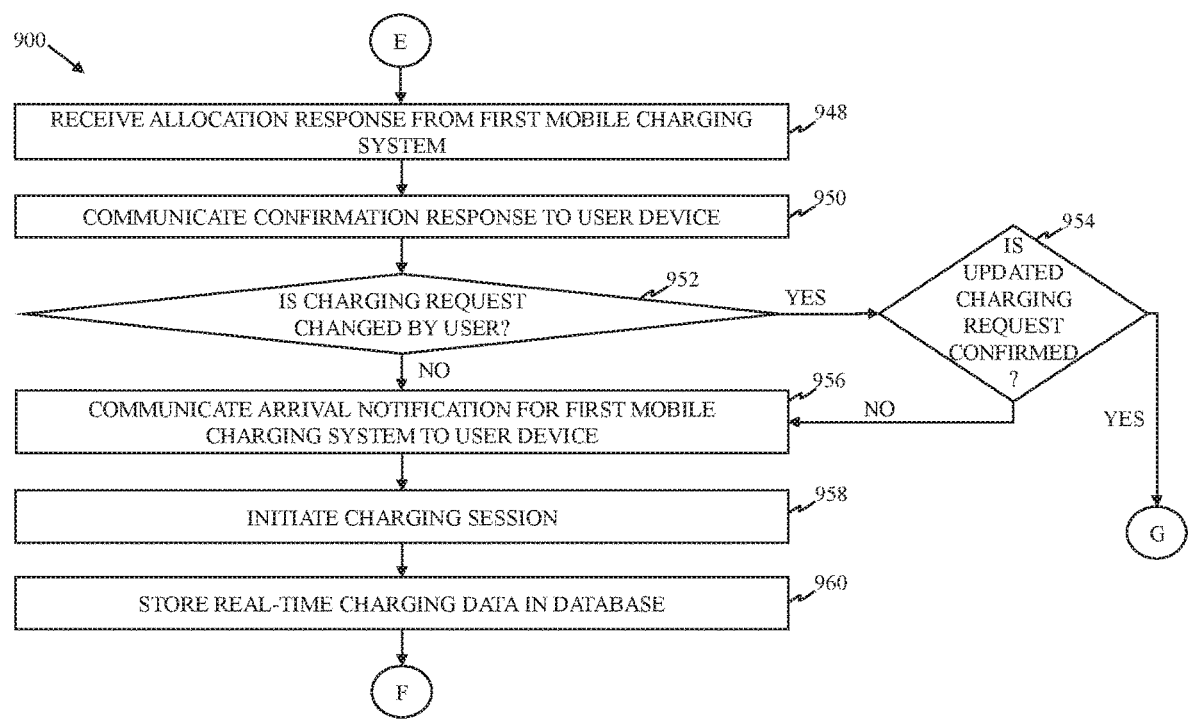
Figure 9E:
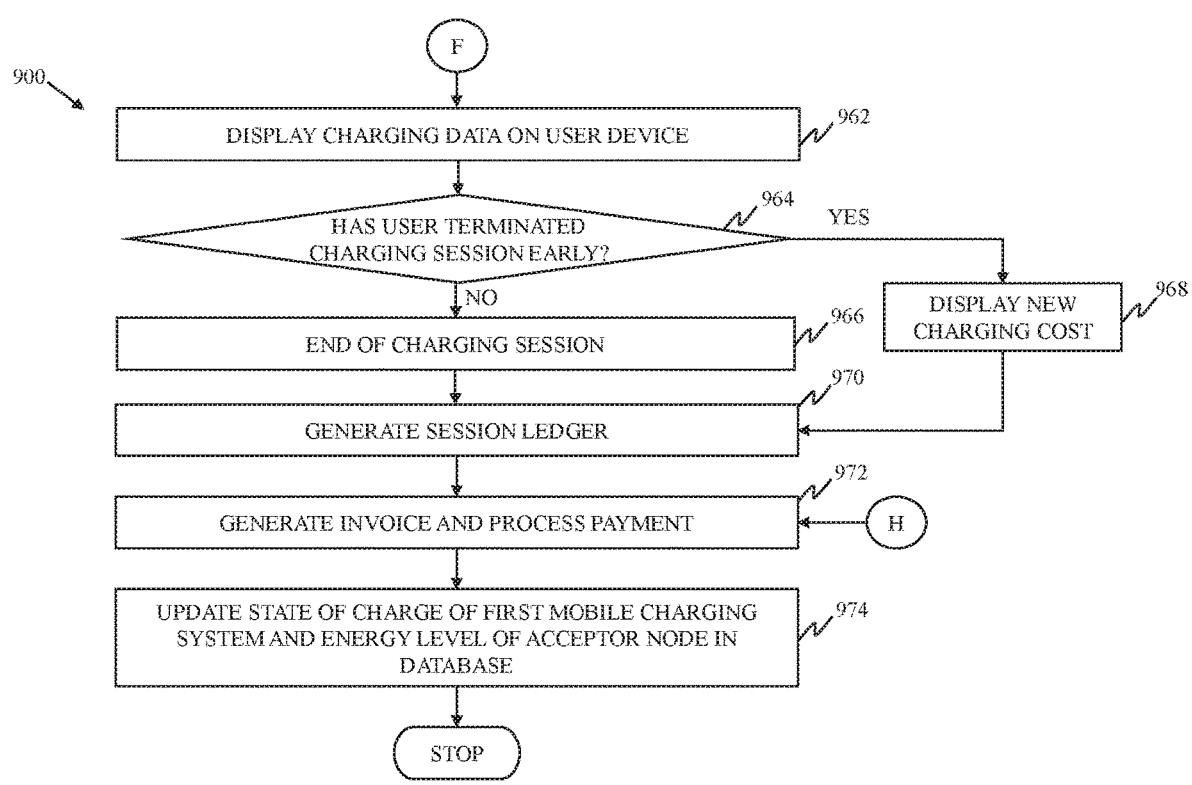
Figure 9F:
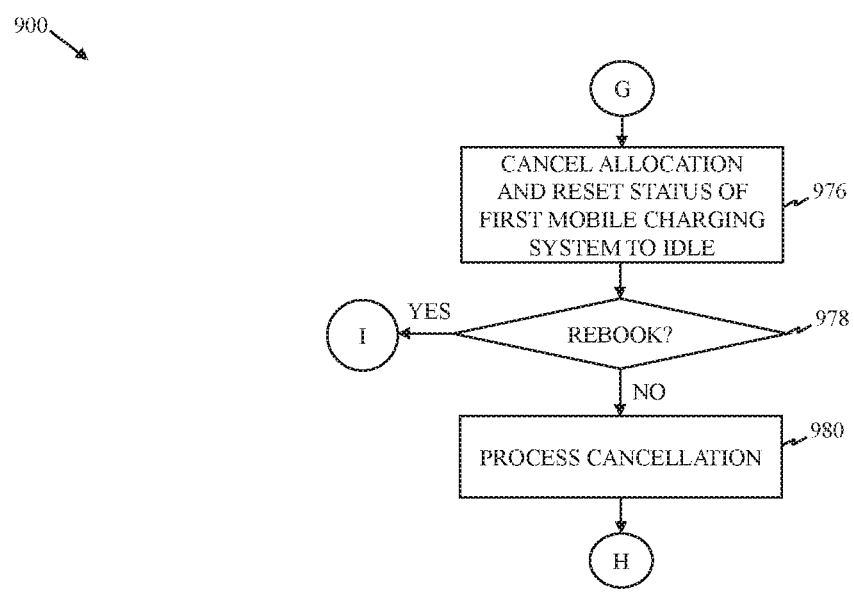

FIG. 8 is a block diagram that illustrates a system architecture of a computer system 800 facilitating charging of an acceptor node by a first mobile charging system, in accordance with an exemplary embodiment of the disclosure. An embodiment of the disclosure, or portions thereof, may be implemented as computer readable code on the computer system 800. In one example, the database 114 or the application server 116 FIG. 1A or 1B may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 9A-9F, 10, 11, 12, and 13.

The computer system 800 may include a processor 802 that may be a special purpose or a general-purpose processing device. The processor 802 may be a single processor or multiple processors. The processor 802 may have one or more processor "cores." Further, the processor 802 may be coupled to a communication infrastructure 804, such as a bus, a bridge, a message queue, the communication network 118, multi-core message-passing scheme, or the like. The computer system 800 may further include a main memory 806 and a secondary memory 808. Examples of the main memory 806 may include RAM, ROM, and the like. The secondary memory 808 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 800 may further include an input/output (I/O) port 810 and a communication interface 812. The I/O port 810 may include various input and output devices that are configured to communicate with the processor 802. Examples of the input devices may include a keyboard, a mouse, a joystick, a touchscreen, a microphone, and the like. Examples of the output devices may include a display screen, a speaker, headphones, and the like. The communication interface 812 may be configured to allow data to be transferred between the computer system 800 and various devices that are communicatively coupled to the computer system 800. Examples of the communication interface 812 may include a modem, a network interface, i.e., an Ethernet card, a communication port, and the like. Data transferred via the communication interface 812 may be signals, such as electronic, electromagnetic, optical, or other signals as will be apparent to a person skilled in the art. The signals may travel via a communications channel, such as the communication network 118, which may be configured to transmit the signals to the various devices that are communicatively coupled to the computer system 800. Examples of the communication channel may include a wired, wireless, and/or optical medium such as cable, fiber optics, a phone line, a cellular phone link, a radio frequency link, and the like. The main memory 806 and the secondary memory 808 may refer to non-transitory computer readable mediums that may provide data that enables the computer system 800 to implement the methods illustrated in FIGS. 9A-9F, 10, 11, 12, and 13.

FIGS. 9A-9F, collectively represent a flowchart 900 that illustrate a method for facilitating charging of an acceptor node by a mobile charging system, in accordance with an exemplary embodiment of the disclosure.

At 902, determine whether an automated request is enabled for the acceptor node 102. The application server 116 may perform operation 902. If at 902, the application server 116 determines that the automated request is not enabled for the acceptor node 102, 904 is executed. At 904, the application server 116 may be configured to wait for the charging request from the acceptor node 102. At 906, the charging request that is manually initiated by the user of the acceptor node 102 is received. The application server 116 may be configured to receive the charging request initiated by way of the user device 105a by the user of the acceptor node 102. At 908, determine whether the user associated with the acceptor node 102 is registered with the application server 116. If at 908, the application server 116 determines that the user is not registered, 910 is executed. At 910, user information of the user is collected from the user device 105a associated with the acceptor node 102. The application server 116 may be configured to collect the user information of the user from the user device 105a associated with the acceptor node 102. At 912, user authentication is performed. The application server 116 may be configured to perform the user authentication of the user associated with the acceptor node 102. In example, the user may be authenticated by way of a one-time password communicated to the user device 105a. At 914, a user profile (e.g., a subscriber profile) is created for the user and stored in the database 114. The application server 116 may be configured to create the user profile of the user and store the created user profile in the database 114 or the memory 206. If at 908, the application server 116 determines that the user is already subscribed, 916 is executed. At 916, charging specifications (such as, type of the energy storage device, capacity of the energy storage device, charging rate of the energy storage device, desired energy level, and the like) are confirmed with the user via the user device 105a. The application server 116 may be configured to confirm the charging specifications with the user. For example, the application server 116 may confirm the charging specifications based on a consent or approval provided by the user by way of the user device 105a. At 918, the charging request is confirmed. The application server 116 may be configured to confirm the charging request based on a consent from the user.

At 930, the set charging parameters is determined for the energy storage device 103a. The application server 116 may be configured to determine the set of parameters for the energy storage device 103a of the acceptor node 102. The set of parameters may include the amount of charge required to charge the energy storage device 103a (shown in FIG. 1) of the acceptor node 102, the turn-around time for achieving the desired energy level, the desired charging rate of the energy storage device 103a (shown in FIG. 1) of the acceptor node 102, and the maximum charging rate of the energy storage device 103a. At 932, one or more mobile charging systems (e.g., the plurality of mobile charging systems 108 and 110) that are available within the first geographical region (e.g., the cells 504a and 504b of the grid map of FIG. 5) and satisfy the set of charging parameters of the energy storage device 103a are identified. The application server 116 may be configured to identify the mobile charging systems 108 and 110 that are available within the first geographical region and satisfy the set of charging parameters for the energy storage device 103a. At 934, the health optimization criteria for each identified mobile charging system 108 and 110 is determined. The application server 116 may be configured to determine the health optimization criteria for each identified mobile charging system 108 and 110. The mobile charging systems 108 and 110 that have an amount of electric charge which is enough to charge the acceptor node 102 and still retain the health optimization criteria may be preferred for charging the acceptor node 102.

At 936, the cost of charging the acceptor node 102 is determined for each identified mobile charging system 108 and 110. The application server 116 may be configured to determine the cost of charging the acceptor node 102 for each identified mobile charging system 108 and 110. The application server 116 may be further configured to determine other factors such as the estimated time of arrival, or the like for each identified mobile charging system 108 and 110. At 938, the identified mobile charging systems 108 and 110 are ranked. The application server 116 may be configured to rank the identified mobile charging systems 108 and 110. The ranking may be based on the health optimization criteria of the charging device of each identified mobile charging system 108 and 110, the charge transfer rate of the charging device of each identified mobile charging system 108 and 110, the turn-around time associated with each identified mobile charging system 108 and 110 to charge the energy storage device 103a (as shown in FIG. 6B), and the cost associated with each identified mobile charging system 108 and 110 to charge the energy storage device 103a. In an embodiment, the ranking of the identified mobile charging systems 108 and 110 may be based on user preferences derived from the behavioral data. For example, the user may have preferred a lower cost as compared to a lower turn-around time in the past, and thus, the identified mobile charging system 108 having a lower cost and a higher turn-around time may be ranked higher as compared to the other identified mobile charging system 110 that has higher cost and lower turn-around time. Similarly, a mobile charging system that was frequently selected by the user for charging the acceptor node 102 in the past may have a higher rank as compared new mobile charging systems.

At 940, the user interface (UI) 604 is rendered via the of user device 105a to present the ranked mobile charging systems 108 and 110 and corresponding cost details to the user. The application server 116 may be configured to render the user interface 604 via the user device 105a to present the ranked mobile charging systems 108 and 110 and corresponding cost details to the user of the user device 105a. At 942, selection for the first mobile charging system from the ranked mobile charging systems 108 and 110 is received. The application server 116 may be configured to receive the selection for the first mobile charging system (e.g., the mobile charging system 108) is received via the user device 105a. The selection is performed by the user of the acceptor node 102.

At 944, the selected mobile charging system 108 is allocated to the acceptor node 102 for charging. The application server 116 may be configured to allocate the selected mobile charging system 108 to the acceptor node 102 for charging. In another embodiment, the application server 116 may be configured to allocate the mobile charging system 108 based on the ranking as described in FIG. 5. At 946, the allocation notification is communicated to the allocated mobile charging system 108. The application server 116 may be configured to communicate the allocation notification to the allocated mobile charging system 108. The allocation notification includes information pertaining to the second location of the acceptor node 102 and the unique identifier of the acceptor node 102.

At 948, the allocation response is received from the allocated mobile charging system 108. The application server 116 may be configured to receive the allocation response, indicative of the acceptance of the charging request, from the allocated mobile charging system 108. At 950, a confirmation response is communicated to the user device 105a. The application server 116 may be configured to communicate the confirmation response to the user device 105a. The confirmation response may include the unique identifier of the mobile charging system 108 and the real-time location of the mobile charging system 108. The confirmation response may further include the real-time location tracking data for the mobile charging system 108, which enables the user to track the real-time path followed by the mobile charging system 108 to reach the second location. The application server 116 may be further configured to hold payment on the user profile associated with the user of the acceptor node 102. For example, the user profile may be linked to a payment mode, such as credit card, a debit card, a digital wallet, or the like. The application server 116 may be configured to hold (e.g., a pre-authorization hold) or block an estimated cost of charging on the linked payment mode.

At 952, determine whether the user has changed or updated the charging request. The application server 116 may be configured to determine whether the charging request is updated or changed. If at 952, the application server 116 determines that the charging request is updated, 954 is executed. At 954, determine whether the user has confirmed the updated charging request. The application server 116 may be configured to determine whether the user has confirmed the updated charging request. If at 954, the application server 116 determines that the updated charging request is not confirmed, 956 is executed. If at 952, the application server 116 determines that the charging request is not updated, 956 is executed.

At 956, the arrival notification of the allocated mobile charging system 108 is communicated to the acceptor node 102 by way of the user device 105a or any other communication device associated with the acceptor node 102. The application server 116 may be configured to communicate the arrival notification of the mobile charging system 108 to the acceptor node 102. The arrival notification indicates that the mobile charging system 108 has reached the second location of the acceptor node 102 for charging. The mobile charging system 108 gains access to the charging inlet of the acceptor node 102. In an embodiment, the application server 116 may enable the mobile charging system 108 to gain access to the charging inlet of the acceptor node 102 as described in conjunction with FIG. 11.

At 958, the charging session is initiated. The application server 116 may be configured to initiate the charging session for charging the acceptor node 102. At 960, real-time charging data is stored in the database 114. The application server 116 may be configured to receive the real-time charging data of the acceptor node 102 from the user device 105a or the driver device 109a and store the received real-time charging data in the database 114 or memory 206. At 962, the real-time charging data is displayed on the user device 105a via the user interface 606. The application server 116 may be configured to display the real-time charging data via the user device 105a.

At 964, determine whether the charging session is terminated early. If at 964, the application server 116 determines that the charging session is not terminated early, 966 is executed. At 966, the charging session ends on completion of charging. The application server 116 may be configured to end the charging session between the acceptor node 102 and the mobile charging system 108 when the desired energy level is achieved for the energy storage device 103a. If at 964, the application server 116 determines that the charging session is terminated early, 968 is executed. At 968, a new charging cost, incurred before the charging session was terminated, is displayed on the user device 105a, and 970 is executed. The application server 116 may be configured to display the new charging cost incurred before the charging session was terminated on the user device 105a.

At 970, a session ledger including details of the charging session is created. The application server 116 may be configured to create the session ledger including the details of the charging session in the database 114 or the memory 206. The session ledged may be stored as a part of the user profile associated with the acceptor node 102. The session ledger may include details associated with the charging session, for example, the unique identifier of the acceptor node 102, the unique identifier of the mobile charging system 108, an amount of charge transferred during the charging session, the second location where charging was performed, the time of charging, the cost incurred for charging, or the like.

At 972, an invoice is generated and the payment for charging is processed. The application server 116 may be configured to generate the invoice and process the payment for the charging session. In an embodiment, the hold or the block is released on the payment mode after the payment is processed. At 974, the state of charge of the mobile charging system 108 and the energy level of the acceptor node 102 is updated in the database 114. The application server 116 may be configured to update the current state of charge of the mobile charging system 108 and the energy level of the acceptor node 102 in the database 114.

If at 954, the application server 116 determines that the updated charging request is confirmed, 976 is executed. At 976, the allocation of the mobile charging system 108 is cancelled and the status of the mobile charging system 108 is reset to idle. The application server 116 may be configured to cancel the allocation of the mobile charging system 108 and reset the status of the mobile charging system 108 to idle. At 978, determine whether the user wants to rebook. If at 978, the application server 116 determines that the user wants to rebook, control is transferred to 918. If at 978, the application server 116 determines that the user does not want to rebook, 980 is executed. At 980, cancellation of the allocation is processed. The application server 116 may be configured to process the cancellation and control is transferred to 972.

If at 902, the application server 116 determines that the automated request is enabled, 920 is executed. At 920, the energy level data is collected periodically from the acceptor node 102. The application server 116 may be configured to periodically collect the energy level data from the acceptor node 102 as described in the foregoing description of FIG. 2. At 922, the current energy level of the acceptor node 102 is obtained from the received energy level data. The application server 116 may be configured to obtain the current energy level of the acceptor node 102 from the energy level data. At 924, the obtained current energy level is compared with the first threshold value associated with the acceptor node 102. At 926, determine whether the current energy level is less than or equal to the first threshold value. If at 926, the application server 116 determines that the current energy level is greater than the first threshold value, 927 is executed. At 927, the current energy level is logged in the database 114 and the energy level data is collected again after some time (e.g., 5 minutes, 10 minutes, 20 minutes, and the like), and control transfers to 920. The application server 116 may be configured to log the current energy level in the database 114. If at 926, the application server 116 determines that the current energy level is less than or equal to the first threshold value, 928 is executed. At 928, the charging request is automatically initiated. The application server 116 may be configured to automatically initiate the charging request and control transfers to 930.

Figure 10:
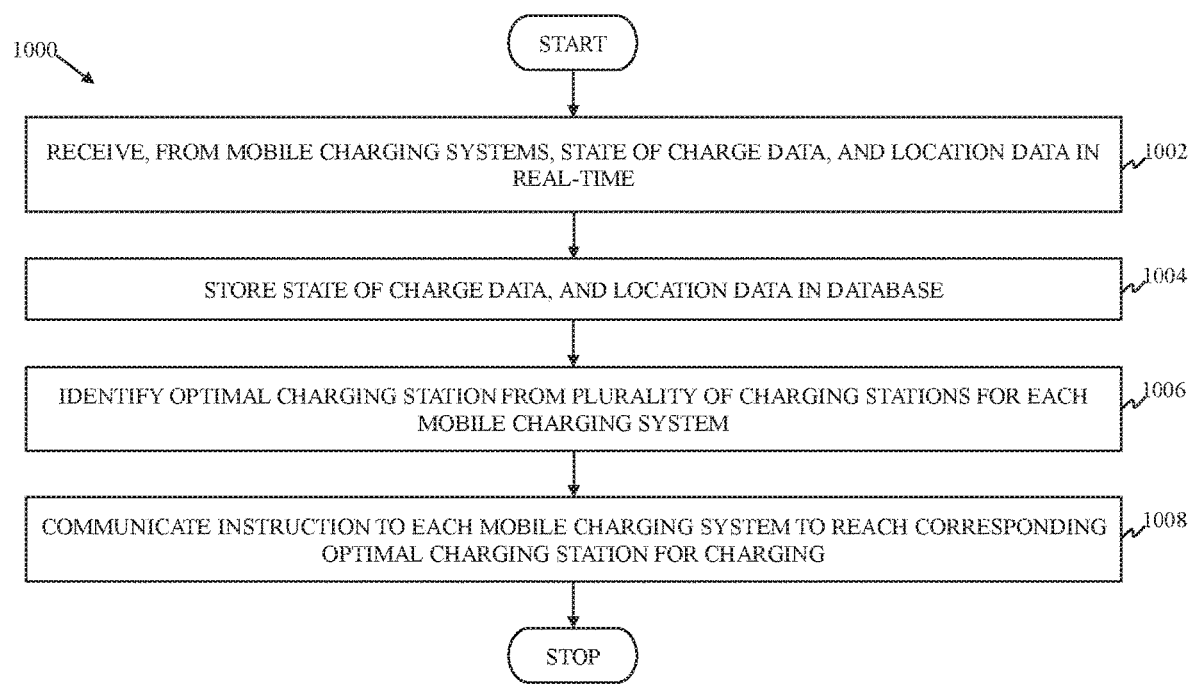
FIG. 10 is a flowchart that illustrates a method for facilitating charging of an acceptor node by a mobile charging system, in accordance with an exemplary embodiment of the present disclosure.

FIG. 10 is a flowchart 1000 that illustrates a method for facilitating charging of the plurality of mobile charging systems 108 and 110, in accordance with an exemplary embodiment of the disclosure.

At 1002, the state of charge data and the location data is received from the plurality of mobile charging systems 108 and 110. The application server 116 may be configured to receive, from each mobile charging system 108 and 110, the state of charge data and the location data in real-time or near real-time. The state of charge data is indicative of the current state of charge of charging device of each mobile charging system 108 and 110. The location data is indicative of the current location of each mobile charging system 108 and 110. At 1004, the state of charge data and the location data are stored in the database 114. The application server 116 may be configured to store, in the database 114, the state of charge data and the location data.

At 1006, the optimal charging station is identified from the plurality of charging stations 112a and 112b for each mobile charging system 108 and 110. The application server 116 may be configured to identify the optimal charging station, from the plurality of charging stations 112a and 112b, for each mobile charging system 108 and 110 based on the drop in the corresponding state of charge of each mobile charging system 108 and 110 up to or below the second threshold value, the availability of each of the plurality of charging stations 112a and 112b, and the turn-around charging time associated with each of the plurality of charging stations 112a and 112b, and the cost of charging the plurality of mobile charging systems 108 and 110 at each of the plurality of charging stations 112a and 112b. The application server 116 may be configured to identify the optimal charging station, from the plurality of charging stations 112a and 112b, for each mobile charging system 108 and 110 further based on the charging rate for charging the plurality of mobile charging systems 108 and 110 at each of the plurality of charging stations 112a and 112b, the configuration of the plurality of mobile charging systems 108 and 110, and the time of day for charging the plurality of mobile charging systems 108 and 110 at each of the plurality of charging stations 112a and 112b.

At 1008, the instruction is communicated to each mobile charging system 108 and 110 to reach the corresponding optimal charging station for charging. The application server 116 may be configured to communicate the instruction to each mobile charging system 108 and 110 to reach the corresponding optimal charging station for charging. Each of the plurality of mobile charging systems 108 and 110 is charged at the corresponding optimal charging station.

In an embodiment, the application server 116 may invoice the plurality of mobile charging systems 108 and 110 for charging at the optimal charging station. In another embodiment, the application server 116 may recommend a location, a time, and a rate for charging to the plurality of mobile charging systems 108 and 110 for an optimal charging. The application server 116 may be configured to make the recommendation, to each mobile charging system 108 and 110 via the corresponding plurality of driver devices 109a and 109b, to achieve an optimal cost of charging, optimal turn-around charging time, and the health optimization criteria of the corresponding charging device.

Figure 11:
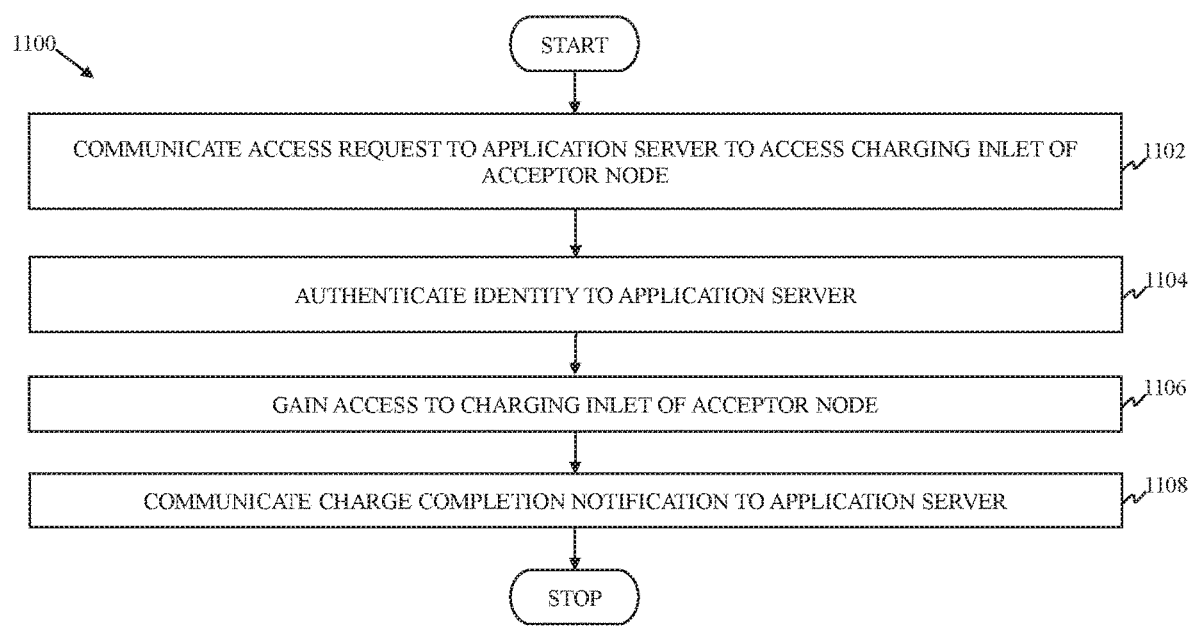
FIG. 11 is a flowchart that illustrates a method for enabling a mobile charging system to access a charging inlet of an acceptor node for charging the acceptor node, in accordance with an exemplary embodiment of the present disclosure.

FIG. 11 is a flow chart 1100 that illustrates a method for enabling the mobile charging system 108 to access the charging inlet of the acceptor node 102 for charging the acceptor node 102, in accordance with an exemplary embodiment of the present disclosure.

At 1102, an access request is communicated to the application server 116 for accessing the charging inlet of the acceptor node 102. On reaching the second location of the acceptor node 102, the mobile charging system 108, may be configured to communicate the access request to the application server 116 via the driver device 109a. In another embodiment, the mobile charging system 108 may communicate the access request upon receiving the allocation notification.

At 1104, identity of the mobile charging system 108 is authenticated with the application server 116. The mobile charging system 108 is configured to authenticate corresponding identity with the application server 116. In an embodiment, the mobile charging system 108 may be configured to communicate a corresponding system identification number to the application server 116. The application server 116 may be configured to compare the received system identification number with a previously stored list of system identification numbers of the plurality of mobile charging systems 108 and 110. The identity of the mobile charging system 108 is successfully authenticated based on a match of the received system identification number. In another embodiment, the mobile charging system 108 may be configured to communicate a password to the application server 116. The application server 116 may be configured to verify the password to authenticate the identity of the mobile charging system 108.

At 1106, access to the charging inlet of the acceptor node 102 is gained. The mobile charging system 108 may be configured to gain the access to the charging inlet of the acceptor node 102. The application server 116 may be configured to provide the access to the charging inlet to the mobile charging system 108. In an embodiment, the application server 116 may be configured to communicate a password to open the charging inlet. In another embodiment, based on a consent of the user of the acceptor node 102, the application server 116 may be configured to open the charging inlet via a cloud-based control for accessing different components of the acceptor node 102. The cloud-based control may be used, by the application server 116, to control closing and opening of the charging inlet of the acceptor node 102.

At 1108, charge completion notification is communicated to the application server 116. The mobile charging system 108 may be configured to communicate the charge completion notification to the application server 116 via the driver device 109a, upon completion of the charging session. The application server 116, upon receiving the charge completion notification, terminates the access to the charging inlet of the acceptor node 102. In one embodiment, the application server 116 may be configured to close the charging inlet, via the cloud-based control, upon receiving the charge completion notification.

Figure 12:
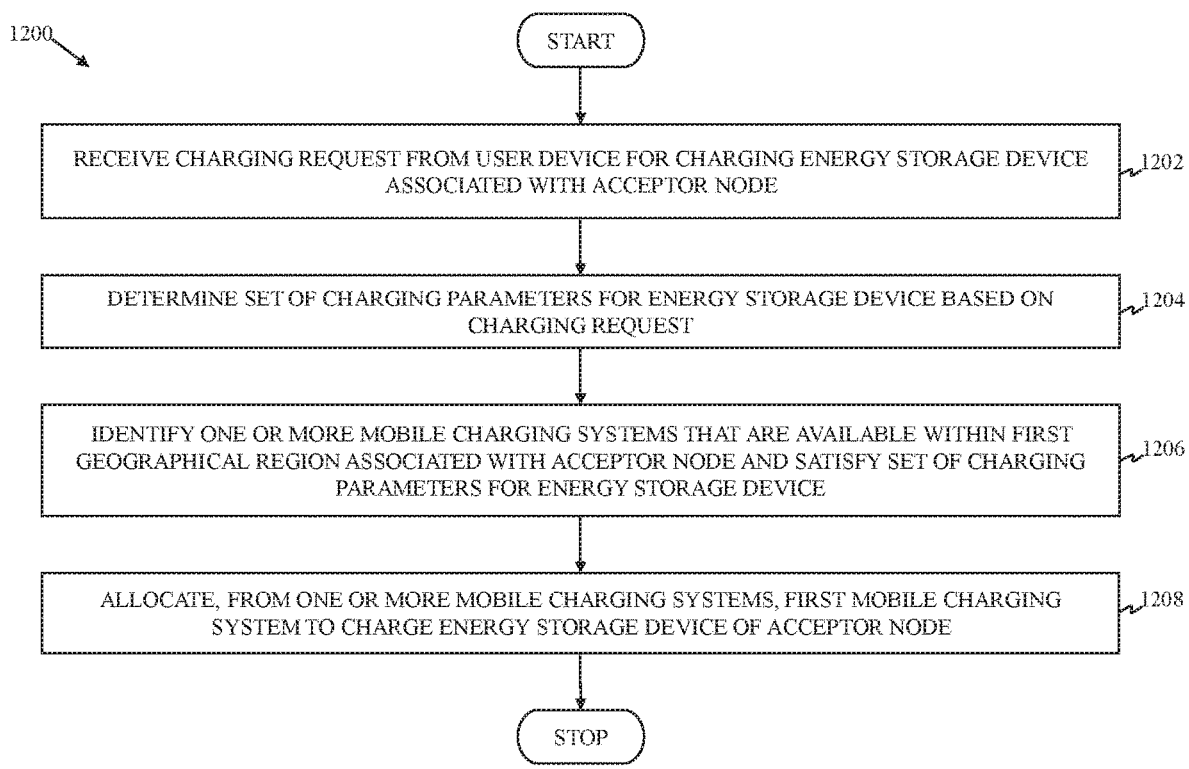
FIG. 12 is a flow chart that illustrates a method for facilitating charging of an acceptor node by a mobile charging system, in accordance with an exemplary embodiment of the present disclosure.

FIG. 12 is a flow chart 1200 that illustrates a method for facilitating charging of the acceptor node 102 by a mobile charging system, in accordance with an exemplary embodiment of the disclosure.

At 1202, the charging request from the user device 105a associated with the acceptor node 102 for charging the energy storage device 103a is received. The application server 116 may be configured to receive the charging request from the user device 105a, associated with the acceptor node 102, for charging the corresponding of energy storage device 103a. The charging request is indicative of the current energy level of the acceptor node 102.

At 1204, the set of charging parameters for the energy storage device 103a is determined. The application server 116 may be further configured to determine the set of charging parameters for the energy storage device 103a based on the charging request. The set of charging parameters includes the amount of charge required to charge the energy storage device 103a.

At 1206, one or more mobile charging systems (e.g., the plurality of mobile charging systems 108 and 110), that are available within the first geographical region associated with the acceptor node 102 and satisfy the set of charging parameters for the corresponding energy storage device 103a, are identified. The application server 116 may be further configured to identify the mobile charging systems 108 and 110 that are available within the first geographical region associated with the acceptor node 102 and satisfy the set of charging parameters for the energy storage device 103a.

In an embodiment, the application server 116 may be further configured to rank the identified mobile charging systems 108 and 110 in the order based on health optimization criteria of charging device of each of the plurality of mobile charging systems 108 and 110, the charge transfer rate of the charging device of each of the plurality of mobile charging systems 108 and 110, and the turn-around time associated with each of the plurality of mobile charging systems 108 and 110 to charge the energy storage device 103a. The application server 116 may be further configured to render the user interface 604, via the user device 105a to present the ranked mobile charging systems 108 and 110 to the user.

At 1208, the mobile charging system 108, from the identified mobile charging systems 108 and 110, is allocated to charge the energy storage device 103a of the acceptor node 102. The application server 116 may be further configured to allocate the mobile charging system 108, from the identified mobile charging systems 108 and 110, to charge the energy storage device 103a of the acceptor node 102. Based on the allocation, the mobile charging system 108 travels from the first location to reach the second location of the acceptor node 102 to charge the energy storage device 103a.

In an embodiment, the application server 116 may be further configured to communicate the confirmation response to the user device 105a to indicate the allocation of the mobile charging system 108 to charge the energy storage device 103a. The confirmation response may be indicative of real-time location tracking information associated with the mobile charging system 108. The application server 116 is further configured to display, via the user interface 606 on the user device 105a while the energy storage device 103a is being charged by the mobile charging system 108, the real-time energy level of the acceptor node 102, the unit of charge received by the energy storage device 103a from the mobile charging system 108, the estimated cost of charging the energy storage device 103a, and the remaining time to charge the energy storage device 103a to the desired energy level.

Figure 13:
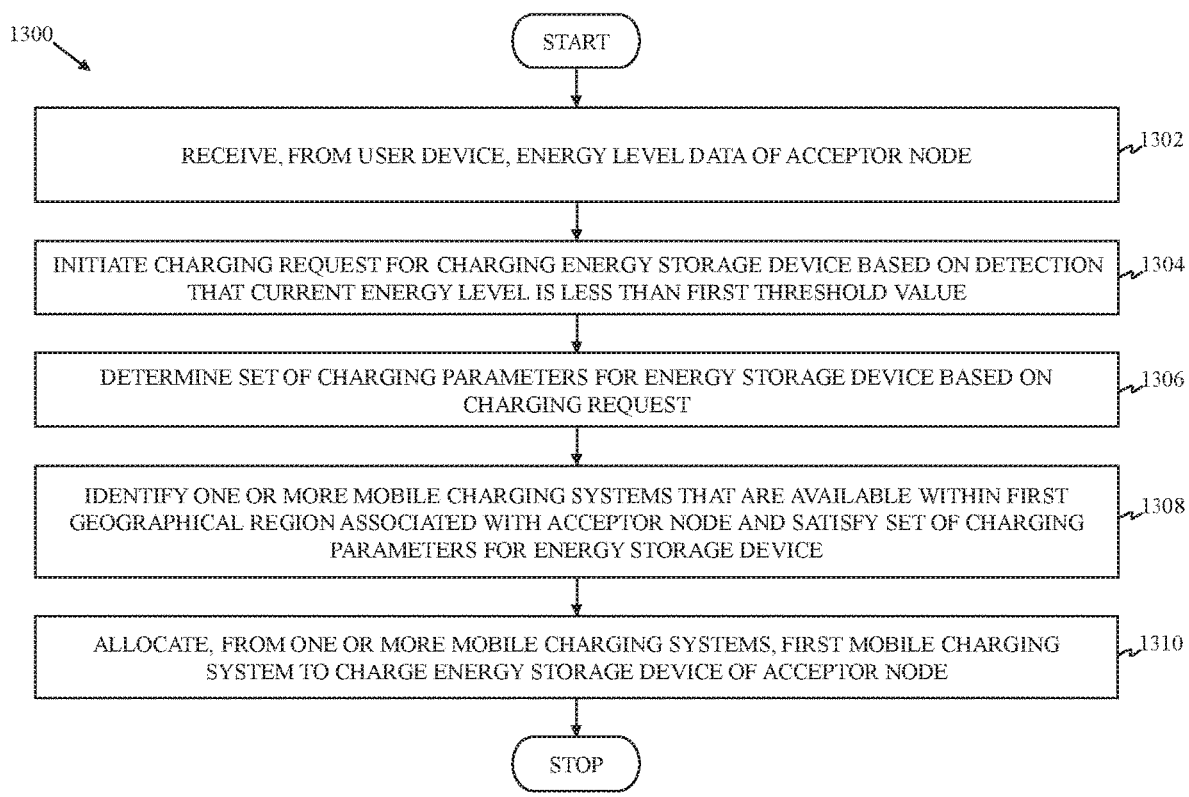
FIG. 13 is a flow chart that illustrates a method for facilitating charging of an acceptor node by a mobile charging system, in accordance with an exemplary embodiment of the present disclosure.

FIG. 13 is a flow chart 1300 that illustrates a method for facilitating charging of the acceptor node 102 by a mobile charging system, in accordance with another exemplary embodiment of the present disclosure.

At 1302, the energy level data of the acceptor node 102 is received from the user device 105a associated with the acceptor node 102. The application server 116 may be configured to receive, from the user device 105a associated with the acceptor node 102, the energy level data of the acceptor node 102. The energy level data indicates the current energy level of the energy storage device 103a of the acceptor node 102.

At 1304, the charging request for charging the energy storage device 103a is initiated based on detection that current energy level is less than the first threshold value. The application server 116 may be further configured to initiate the charging request for charging the energy storage device 103a based on the detection that the current energy level is less than the first threshold value.

At 1306, the set of parameters for the energy storage device 103a is determined. The application server 116 may be further configured to determine the set of charging parameters for the energy storage device 103a based on the charging request. The set of charging parameters includes an amount of charge required to charge the energy storage device 103a.

At 1308, the mobile charging systems 108 and 110, that are available within the first geographical region associated with the acceptor node 102 and satisfy the set of charging parameters for energy storage device 103a, are identified. The application server 116 may be further configured to identify the mobile charging systems 108 and 110 that are available within the first geographical region associated with the acceptor node 102 and satisfy the set of charging parameters for the energy storage device 103a.

In an embodiment, the application server 116 may be further configured to rank the plurality of mobile charging systems 108 and 110 in the order based on health optimization criteria of the charging device of each of the plurality of mobile charging systems 108 and 110, the charge transfer rate of the charging device of each of the plurality of mobile charging systems 108 and 110, and the turn-around time associated with each of the plurality of mobile charging systems 108 and 110 to charge the energy storage device 103a. The application server 116 may be further configured to render the user interface, via the user device 105a to present the ranked plurality of mobile charging systems 108 and 110 to the user.

At 1310, the mobile charging system 108, from the identified mobile charging systems 108 and 110, is allocated to charge the energy storage device 103a of the acceptor node 102. The application server 116 may be configured to allocate the mobile charging system 108 to charge the energy storage device 103a of the acceptor node 102. Based on the allocation, the mobile charging system 108 travels from the first location to reach the second location of the acceptor node 102 to charge the energy storage device 103a.

In an embodiment, the application server 116 may be further configured to communicate the confirmation response to the user device 105a to indicate the allocation of the mobile charging system 108 to charge the energy storage device 103a. The confirmation response is indicative of real-time location tracking information associated with the mobile charging system 108. The application server 116 may be further configured to display, via the user interface 606 on the user device 105a while the energy storage device 103a is being charged by the mobile charging system 108, the real-time energy level of the acceptor node 102, the unit of charge received by the energy storage device 103a from the mobile charging system 108, the estimated cost of charging the energy storage device 103a, and the remaining time to charge the energy storage device 103a to the desired energy level.

Various embodiments of the disclosure provide the application server 116 for facilitating charging of the acceptor node 102 by the mobile charging system 108. The application server 116 may be configured to receive the charging request from the user device 105a, associated with the acceptor node 102, for charging the energy storage device 103a. The charging request is indicative of the current energy level of the acceptor node 102. In another embodiment, the application server 116 may be configured to receive, from the user device 105a associated with the acceptor node 102, the energy level data of the energy storage device 103a. The energy level data indicates current energy level of the energy storage device 103a of the acceptor node 102. The application server 116 may be further configured to initiate the charging request for charging the energy storage device 103a based on the detection that the current energy level is less than the first threshold value. The application server 116 may be further configured to determine the set of charging parameters for the energy storage device 103a based on the charging request. The set of charging parameters includes at least an amount of charge required to charge the energy storage device 103a. The application server 116 may be further configured to identify the plurality of mobile charging systems 108 and 110 that are available within the first geographical region associated with the acceptor node 102 and satisfy the set of charging parameters for the energy storage device 103a. The application server 116 may be further configured to rank the plurality of mobile charging systems 108 and 110 in the order based on health optimization criteria of the charging device of each of the plurality of mobile charging systems 108 and 110, the charge transfer rate of the charging device of each of the plurality of mobile charging systems 108 and 110, and the turn-around time associated with each of the plurality of mobile charging systems 108 and 110 to charge the energy storage device 103a. The application server 116 may be further configured to render the user interface 604, via the user device 105a to present the ranked plurality of mobile charging systems 108 and 110 to the user. The application server 116 may be further configured to allocate the mobile charging system 108, from the plurality of mobile charging systems 108 and 110, to charge the energy storage device 103a of the acceptor node 102. Based on the allocation, the mobile charging system 108 travels from the first location to reach the second location of the acceptor node 102 to charge the energy storage device 103a. The application server 116 may be further configured to communicate the confirmation response to the user device 105a to indicate the allocation of the mobile charging system 108 to charge the energy storage device 103a. The confirmation response is indicative of real-time location tracking information associated with the mobile charging system 108. The application server 116 may be further configured to display, via the user interface 606 on the user device 105a while the energy storage device 103a is being charged by the mobile charging system 108, the real-time energy level of the acceptor node 102, the unit of charge received by the energy storage device 103a from the mobile charging system 108, the estimated cost of charging the energy storage device 103a, and the remaining time to charge the energy storage device 103a to the desired energy level.

Various embodiments of the disclosure provide a non-transitory computer readable medium having stored thereon, computer executable instructions, which when executed by a computer, cause the computer to execute one or more operations for facilitating charging of the acceptor node 102 by the mobile charging system 108. The one or more operations include receiving the charging request from the user device 105a, associated with the acceptor node 102, for charging the corresponding energy storage device 103a. The charging request is indicative of the current energy level of the acceptor node 102. In another embodiment, the operation includes receiving, from the user device 105a associated with the acceptor node 102, energy level data of the acceptor node 102. The energy level data indicates a current energy level of the energy storage device 103a of the acceptor node 102. The operation further includes initiating the charging request for charging the energy storage device 103a based on the detection that the current energy level is less than the first threshold value. The operation includes determining the set of charging parameters for the energy storage device 103a based on the charging request. The set of charging parameters includes at least an amount of charge required to charge the energy storage device 103a. The operation further includes identifying the plurality of mobile charging systems 108 and 110 that are available within the first geographical region associated with the acceptor node 102 and satisfy the set of charging parameters for the energy storage device 103a. The operation includes ranking the plurality of mobile charging systems 108 and 110 in the order based on health optimization criteria of charging device of each of the plurality of mobile charging systems 108 and 110, the charge transfer rate of the charging device of each of the plurality of mobile charging systems 108 and 110, and the turn-around time associated with each of the plurality of mobile charging systems 108 and 110 to charge the energy storage device 103a. The operation further includes rendering the user interface 604, via the user device 105a, to present the ranked plurality of mobile charging systems 108 and 110 to the user. The operation includes allocating the mobile charging system 108, from the plurality of mobile charging systems 108 and 110, to charge the energy storage device 103a of the acceptor node 102. Based on the allocation, the mobile charging system 108 travels from the first location to reach the second location of the acceptor node 102 to charge the energy storage device 103a. The operation includes communicating the confirmation response to the user device 105a to indicate the allocation of the mobile charging system 108 to charge the energy storage device 103a. The confirmation response is indicative of real-time location tracking information associated with the mobile charging system 108. The operation also includes displaying, via the user interface 606 on the user device 105a while the corresponding energy storage device 103a is being charged by the mobile charging system 108, the real-time energy level of the acceptor node 102, the unit of charge received by the energy storage device 103a from the mobile charging system 108, the estimated cost of charging the energy storage device 103a, and the remaining time to charge the corresponding energy storage device 103a to the desired energy level.

The disclosed embodiments encompass numerous advantages. Exemplary advantages of the disclosed methods include, but are not limited to, ensuring round the clock availability of charge in the plurality of acceptor nodes 102-106 and on demand charging during emergency situations. The disclosed methods and systems allow for charging the plurality of acceptor nodes 102-106 with significantly reduced human intervention, time, and effort. The disclosed methods facilitate charging of the plurality of acceptor nodes 102-106 with a zero downtime. The disclosed methods distribute a load of charging over 24 hours and geographical location associated with the plurality of acceptor nodes 102-106. Further, the disclosed methods eliminate a requirement for installing and upgrading infrastructure for charging the plurality of acceptor nodes 102-106. The disclosed methods further allow for a seamless approach for periodically charging the plurality of acceptor nodes 102-106. Further, the disclosed systems and methods allow for charging the plurality of acceptor nodes 102-106 based on the health optimization criteria. Therefore, the disclosed systems and methods ensure good health and increased life span of the plurality of energy storage devices 103a-103c of the plurality of acceptor nodes 102-106. Further, the disclosed systems and methods allow for charging the plurality of acceptor nodes 102-106 based on the user preferences and the behavioral data of the corresponding plurality of users. Therefore, the disclosed systems and methods ensure significant reduction in inconvenience faced by the plurality of users while using the plurality of acceptor nodes 102-106. Further, the disclosed methods and systems enable an organized network of the plurality of mobile charging systems 108 and 110 that provide a convenient approach for charging the plurality of acceptor nodes 102-106. Thus, the disclosed methods and systems provide a real-time aggregation of the plurality of mobile charging systems 108 and 110 and an optimal allocation thereof for facilitating charging of the plurality of acceptor nodes 102-106. Further, the disclosed systems and methods utilize real-time statistical data associated with the energy storage devices 103a-103c, and user preference and behavior of the corresponding plurality of users. Therefore, the allocation of the plurality of mobile charging systems 108 and 110 is carried out with a most optimal approach. The disclosed methods and systems allow the plurality of acceptor nodes 102-106 to be charged at its own location or at street parkings. Therefore, the disclosed methods and systems significantly reduce chances, for vehicles, of getting stranded due to discharged energy storage device. Further, the disclosed methods and systems significantly reduce or eliminate a requirement of moving or transporting the plurality of acceptor nodes 102-106 for charging. The disclosed methods and systems also reduce, for houses and buildings, chances to experience a power interruption due to power failure. Since the disclosed methods eliminate a need for an end user to specifically visit a charging station for charging a corresponding acceptor node 102-106 or installing and upgrading infrastructure, a cost for charging the plurality of acceptor nodes 102-106 is significantly reduced. Further, the disclosed methods incentivize the plurality of users for charging the corresponding plurality of energy storage devices 103a-103c in accordance with the health optimization criteria. Therefore, the plurality of users are motivated to keep the plurality of energy storage devices 103a-103c in good health. The disclosed methods incentivize the plurality of drivers of the plurality of mobile charging systems 108 and 110 for charging the corresponding charging device in accordance with the health optimization criteria. Therefore, the plurality of drivers are motivated to keep the plurality of mobile charging systems 108 and 110 in good health. Therefore, the disclosed methods ensure good state of health, extended life-span i.e., longevity, and profitability of the plurality of acceptor nodes 102-106 and the plurality of mobile charging systems 108 and 110. The methods and systems disclosed herein may be utilized by a charging service provider, a fleet aggregator, an electric vehicle supplier, a private electronic vehicle user, a group of users having private electric vehicles, or the like.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for facilitating charging of an acceptor node by a mobile charging system. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method for facilitating charging, the method comprising:
    receiving, by an application server, a charging request from a user device for charging an energy storage device associated with an acceptor node, wherein the charging request is indicative of a current energy level of the acceptor node;
    determining, by the application server, a set of charging parameters for the energy storage device based on the charging request, wherein the set of charging parameters includes at least an amount of charge required to charge the energy storage device;
    identifying, by the application server, one or more mobile charging systems that satisfy the set of charging parameters for the energy storage device, wherein the identified one or more mobile charging systems are available within a first geographical region associated with the acceptor node; and
    allocating, by the application server, from the one or more mobile charging systems, a first mobile charging system to charge the energy storage device of the acceptor node, wherein based on the allocation, the first mobile charging system travels from a first location to reach a second location of the acceptor node to charge the energy storage device.

2. The method of claim 1, wherein the charging request is initiated at the user device based on at least one of behavioral data associated with historical charging of the energy storage device and a detection that the current energy level of the acceptor node is less than a first threshold value.

3. The method of claim 2, wherein the first threshold value is based on at least one of health optimization criteria of the energy storage device, a user preference of a user associated with the acceptor node, and the behavioral data associated with the historical charging of the energy storage device.

4. The method of claim 1, wherein the charging request is further indicative of at least one of a desired energy level of the acceptor node, a charging capacity of the energy storage device, a desired charging rate of the energy storage device, a maximum charging rate of the energy storage device, and a turn-around time for achieving the desired energy level.

5. The method of claim 4, wherein the set of charging parameters further includes the turn-around time for achieving the desired energy level, the desired charging rate of the energy storage device, and the maximum charging rate of the energy storage device.

6. The method of claim 1, further comprising ranking, by the application server, the one or more mobile charging systems in an order based on at least one of health optimization criteria of a charging device of each of the one or more mobile charging systems, a charge transfer rate of the charging device of each of the one or more mobile charging systems, and a turn-around time associated with each of the one or more mobile charging systems to charge the energy storage device.

7. The method of claim 6, wherein the first mobile charging system is allocated based on at least one of a user preference of a user associated with the acceptor node and the ranking of the one or more mobile charging systems.

8. The method of claim 7, further comprising rendering, by the application server, a user interface, via the user device, to present the ranked one or more mobile charging systems to the user, wherein the user preference includes a selection of the first mobile charging system from the ranked one or more mobile charging systems to charge the energy storage device.

9. The method of claim 1, further comprising communicating, by the application server, a confirmation response to the user device to indicate the allocation of the first mobile charging system to charge the energy storage device, wherein the confirmation response is indicative of real-time location tracking information associated with the first mobile charging system.

10. The method of claim 1, further comprising displaying, via a user interface on the user device while the energy storage device is being charged by the first mobile charging system, a real-time energy level of the acceptor node, a unit of charge received by the energy storage device from the first mobile charging system, an estimated cost of charging the energy storage device, and a remaining time to charge the energy storage device to a desired energy level.

11. The method of claim 1, further comprising:
receiving, by the application server, from each of the one or more mobile charging systems, state of charge data and location data in real-time or near real-time, wherein the state of charge data is indicative of a state of charge of charging device of each of the one or more mobile charging systems;
storing, by the application server, in a database, the state of charge data and the location data;
identifying, by the application server, an optimal charging station from a plurality of charging stations for each of the one or more mobile charging systems based on at least a drop in the corresponding state of charge of each of the one or more mobile charging systems up to or below a second threshold value, an availability of each of the plurality of charging stations, a turn-around charging time associated with each of the plurality of charging stations, a cost associated with charging the one or more mobile charging systems at each of the plurality of charging stations, a charging rate for charging the one or more mobile charging systems at each of the plurality of charging stations, and a configuration of the one or more mobile charging systems; and
communicating, by the application server, an instruction to each of the one or more mobile charging systems to reach the corresponding optimal charging station, wherein each of the one or more mobile charging systems is charged at the corresponding optimal charging station.

12. The method of claim 11, wherein the one or more mobile charging systems that are available within the first geographical region are identified based on the stored location data.

13. The method of claim 1, further comprising communicating, by the application server, an allocation notification to the first mobile charging system based on the allocation, wherein the first mobile charging system reaches the second location from the first location based on the allocation notification.

14. The method of claim 1, wherein the acceptor node is one of a vehicle or a building having the energy storage device to power one or more electronic components.

15. A system to facilitate charging, the system comprising:
an application server configured to:
receive a charging request from a user device for charging an energy storage device associated with an acceptor node, wherein the charging request is indicative of a current energy level of the acceptor node;
determine a set of charging parameters for the energy storage device based on the charging request, wherein the set of charging parameters includes at least an amount of charge required to charge the energy storage device;
identify one or more mobile charging systems that satisfy the set of charging parameters for the energy storage device, wherein the identified one or more mobile charging systems are available within a first geographical region associated with the acceptor node; and
allocate, from the one or more mobile charging systems, a first mobile charging system to charge the energy storage device of the acceptor node, wherein based on the allocation, the first mobile charging system travels from a first location to reach a second location of the acceptor node to charge the energy storage device.

16. The system of claim 15, wherein the charging request is further indicative of at least one of a desired energy level of the acceptor node, a charging capacity of the energy storage device, a desired charging rate of the energy storage device, a maximum charging rate of the energy storage device, and a turn-around time for achieving the desired energy level.

17. The system of claim 15, wherein the application server is further configured to:
receive, from each of the one or more mobile charging systems, state of charge data and location data in real-time or near real-time, wherein the state of charge data is indicative of a state of charge of a charging device of each of the one or more mobile charging systems;
store, in a database, the state of charge data and the location data, wherein the one or more mobile charging systems that are available within the first geographical region are identified based on the stored location data;
identify an optimal charging station from a plurality of charging stations for each of the one or more mobile charging systems based on at least a drop in the corresponding state of charge of each of the one or more mobile charging systems up to or below a second threshold value, an availability of each of the plurality of charging stations, a turn-around charging time associated with each of the plurality of charging stations, a cost associated with charging the one or more mobile charging systems at each of the plurality of charging stations, a charging rate for charging the one or more mobile charging systems at each of the plurality of charging stations, and a configuration of the one or more mobile charging systems; and
communicate an instruction to each of the one or more mobile charging systems to reach the corresponding optimal charging station, wherein each of the one or more mobile charging systems is charged at the corresponding optimal charging station.

18. A method for facilitating charging, the method comprising:
- receiving, by an application server, from a user device associated with an acceptor node, energy level data of the acceptor node, wherein the energy level data indicates current energy level of an energy storage device of the acceptor node;
- initiating, by the application server, a charging request for charging the energy storage device based on a detection that the current energy level is less than a first threshold value;
- determining, by the application server, a set of charging parameters for the energy storage device based on the charging request, wherein the set of charging parameters includes at least an amount of charge required to charge the energy storage device;
- identifying, by the application server, one or more mobile charging systems that satisfy the set of charging parameters of the energy storage device, wherein the identified one or more mobile charging systems are available within a first geographical region associated with the acceptor node; and
- allocating, by the application server, from the one or more mobile charging systems, a first mobile charging system to charge the energy storage device of the acceptor node, wherein based on the allocation, the first mobile charging system travels from a first location to reach a second location of the acceptor node to charge the energy storage device.

19. The method of claim 18, wherein the first threshold value is based on at least one of health optimization criteria of the energy storage device, a user preference of a user associated with the acceptor node, and behavioral data associated with historical charging of the energy storage device.

20. The method of claim 19, further comprising incentivizing, by the application server, the user associated with the acceptor node for charging the energy storage device of the acceptor node based on the health optimization criteria of the energy storage device.

21. The method of claim 18, wherein the set of charging parameters further includes a turn-around time to charge the energy storage device, a desired charging rate of the energy storage device, and a maximum charging rate of the energy storage device.

* * * * *